US012584504B2

(12) United States Patent
Torii

(10) Patent No.: US 12,584,504 B2
(45) Date of Patent: Mar. 24, 2026

(54) HYDRAULIC UNIT

(71) Applicant: DAIKIN INDUSTRIES, LTD., Osaka (JP)

(72) Inventor: Hiroshi Torii, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 18/596,408

(22) Filed: Mar. 5, 2024

(65) Prior Publication Data

US 2024/0263652 A1 Aug. 8, 2024

Related U.S. Application Data

(63) Continuation of application No. PCT/JP2022/027398, filed on Jul. 12, 2022.

(30) Foreign Application Priority Data

Sep. 7, 2021 (JP) ................................ 2021-145508

(51) Int. Cl.

*F15B 21/0423* (2019.01)
*F04B 39/06* (2006.01)
*F04B 53/08* (2006.01)
*F15B 21/0427* (2019.01)

(52) U.S. Cl.

CPC .......... *F15B 21/0423* (2019.01); *F04B 39/06* (2013.01); *F04B 53/08* (2013.01); *F15B 21/0427* (2019.01); *F15B 2211/62* (2013.01)

(58) Field of Classification Search

CPC ...... F04B 39/06; F04B 53/08; F15B 21/0423; F15B 21/0427; F15B 2211/62

See application file for complete search history.

(56) References Cited

U.S. PATENT DOCUMENTS 8,876,495 B2 11/2014 Galloway et al.
2004/0060290 A1* 4/2004 Stahlman ................ F04B 17/06 60/456
2009/0229793 A1 9/2009 Trieb et al.
2011/0014070 A1* 1/2011 Douglas ................ F04B 35/045 417/411

(Continued)

FOREIGN PATENT DOCUMENTS

CN 201517534 U 6/2010
DE 10 2018 214 753 B4 7/2020

(Continued)

OTHER PUBLICATIONS

International Search Report of corresponding PCT Application No. PCT/JP2022/027398 dated Sep. 20, 2022.

(Continued)

*Primary Examiner* — Matthew Wiblin
(74) *Attorney, Agent, or Firm* — Spencer Fane LLP

(57) ABSTRACT

A hydraulic unit includes an oil tank, a hydraulic pump, a first return pipe, and a first heat exchanger. The oil tank stores a hydraulic oil. The hydraulic pump supplies the hydraulic oil in the oil tank to an actuator. The first return pipe returns the hydraulic oil from a flow path between a discharge port of the hydraulic pump and the actuator to the oil tank. The first heat exchanger causes a coolant to exchange heat with the hydraulic oil returning to the oil tank through the first return pipe.

17 Claims, 35 Drawing Sheets

(56) References Cited

U.S. PATENT DOCUMENTS

| | | | | |
|---|---|---|---|---|
| 2013/0342045 | A1 | 12/2013 | Matsuki et al. | |
| 2017/0067227 | A1* | 3/2017 | Ota | B60L 1/02 |
| 2019/0376535 | A1 | 12/2019 | Mitsui et al. | |
| 2021/0257883 | A1* | 8/2021 | Kim | B60K 1/00 |

FOREIGN PATENT DOCUMENTS

| | | | |
|---|---|---|---|
| EP | 2 378 122 | A2 | 10/2011 |
| JP | 5-8278 | A | 1/1993 |
| JP | 5-312199 | A | 11/1993 |
| JP | 8-281760 | A | 10/1996 |
| JP | 2008-5676 | A | 1/2008 |
| JP | 2008-8252 | A | 1/2008 |
| JP | 4440574 | B2 | 3/2010 |
| JP | 4684070 | B2 | 5/2011 |
| JP | 2011-226365 | A | 11/2011 |
| JP | 2012-96425 | A | 5/2012 |
| JP | 2012-191826 | A | 10/2012 |
| JP | 2018-182924 | A | 11/2018 |

OTHER PUBLICATIONS

European Search Report of corresponding EP Application No. 22 86 7081.6 dated Oct. 15, 2024.

International Preliminary Report of corresponding PCT Application No. PCT/JP2022/027398 dated Mar. 21, 2024.

* cited by examiner

HYDRAULIC UNIT

CROSS-REFERENCE TO RELATED APPLICATIONS

This application is a Continuation of PCT International Application No. PCT/JP2022/027398, filed on Jul. 12, 2022, which claims priority under 35 U.S.C. § 119(a) to Patent Application No. 2021-145508, filed in Japan on Sep. 7, 2021, all of which are hereby expressly incorporated by reference into the present application.

BACKGROUND

Technical Field

The present disclosure relates to a hydraulic unit.

Background Art

A known hydraulic unit includes a motor that drives a hydraulic pump and an air-cooling cooler that cools a hydraulic oil. The motor and the air-cooling cooler are cooled by means of an air flow generated by a fan (see, for example, JP 2008-8252 A.

SUMMARY

A hydraulic unit according to a first aspect of the present disclosure includes an oil tank, a hydraulic pump, a first return pipe, and a first heat exchanger. The oil tank stores a hydraulic oil. The hydraulic pump supplies the hydraulic oil in the oil tank to an actuator. The first return pipe returns the hydraulic oil from a flow path between a discharge port of the hydraulic pump and the actuator to the oil tank. The first heat exchanger causes a coolant to exchange heat with the hydraulic oil returning to the oil tank through the first return pipe.

DETAILED DESCRIPTION OF EMBODIMENT(S)

Figure 1:
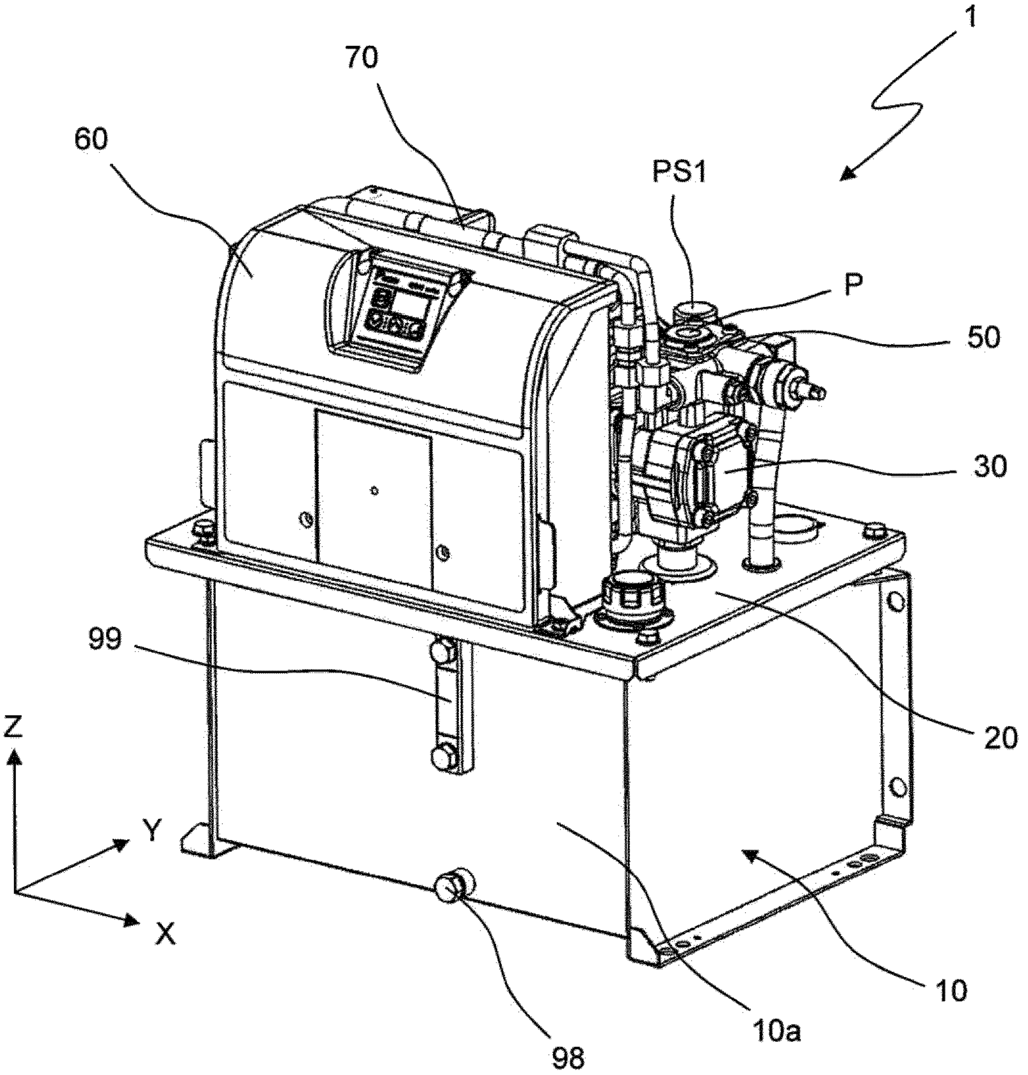
FIG. 1 is a perspective view of a front side of a hydraulic unit according to a first embodiment of the present disclosure as viewed obliquely from above.

Embodiments will be described below. In the drawings, the same reference numerals represent the same or corresponding parts. In addition, the dimensions on the drawings, such as lengths, widths, thicknesses, and depths, are appropriately changed from actual scales for clarity and simplification of the drawings, and do not represent actual relative dimensions. In the drawings, a left-right direction is defined as an X-axis direction, a front-rear direction is defined as a Y-axis direction, and an up-down direction is defined as a Z-axis direction.

First Embodiment

Figure 2:
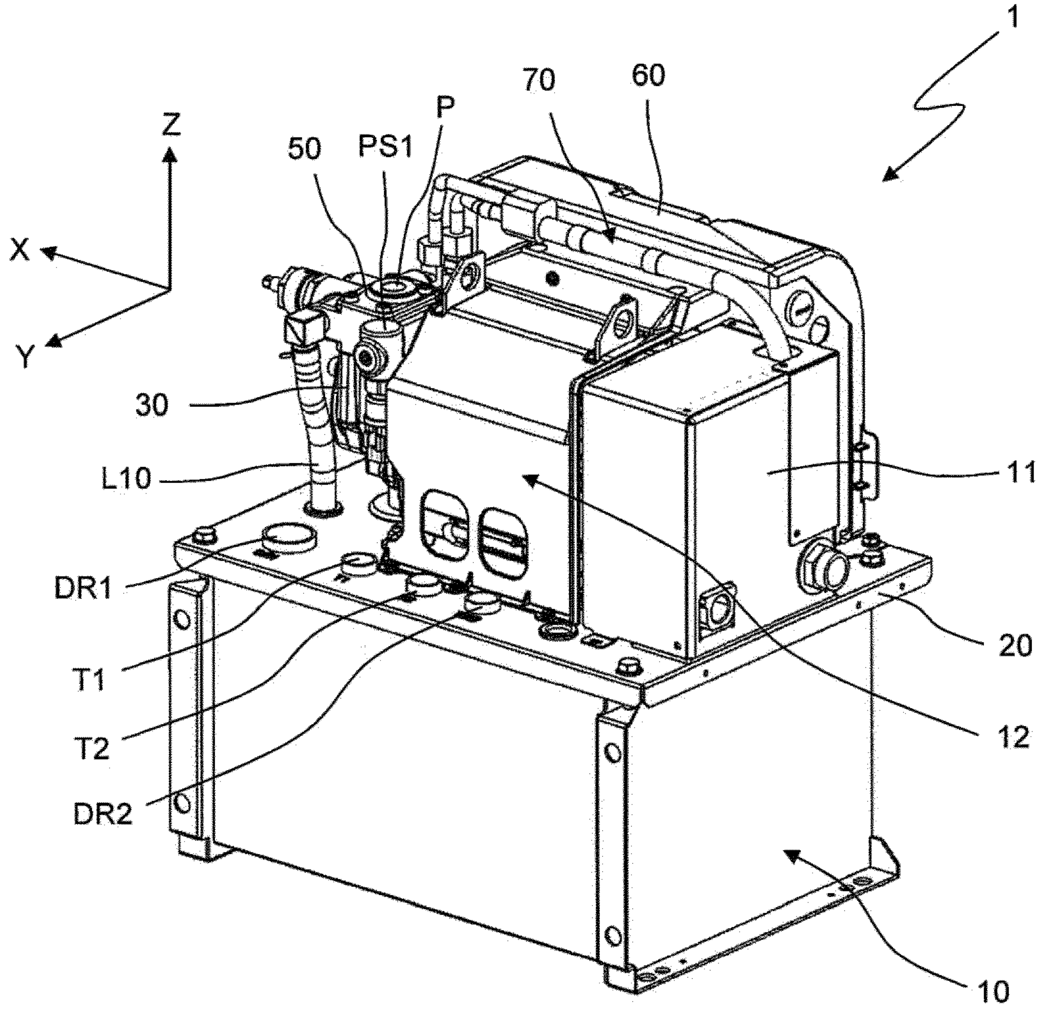
FIG. 2 is a perspective view of a rear side of the hydraulic unit according to the first embodiment as viewed obliquely from above.

FIG. 1 is a perspective view of a front side of a hydraulic unit 1 according to a first embodiment of the present disclosure as viewed obliquely from above, and FIG. 2 is a perspective view of a rear side of the hydraulic unit 1 as viewed obliquely from above. The hydraulic unit 1 is used in an industrial machine (main machine) such as an injection molding machine, a press machine, or a machine tool (the same applies to hydraulic units 2 to 6 according to second to sixth embodiments).

As illustrated in FIGS. 1 and 2, the hydraulic unit 1 includes an oil tank 10 that stores a hydraulic oil (fluid), a base 20 attached to an upper portion of the oil tank 10, a hydraulic pump 30, a motor 40 (illustrated in FIG. 3) that drives the hydraulic pump 30, a relief valve 50 connected to a discharge port 30*a* (illustrated in FIG. 14) of the hydraulic pump 30, and a controller 60 that controls the motor 40 and the like. The hydraulic pump 30, the motor 40, the relief valve 50, and the controller 60 are mounted on the base 20. An oil level gauge 99 is attached to a side wall 10*a* on a front side of the oil tank 10. An oil-drain port 98 is provided below the oil level gauge 99 on the side wall 10*a* of the oil tank 10. The controller 60 is an example of a control unit.

In FIG. 2, 11 denotes a first protection cover that covers a side of the motor 40 remote from the hydraulic pump 30, an electromagnetic valve V1 (illustrated in FIG. 3), and the like, 12 denotes a second protection cover that covers a main part of the motor 40, and 70 denotes a first heat exchanger that cools the hydraulic oil. L10 denotes a drain hose, P denotes a pump port, T1 and T2 denote tank ports, and DR1 and DR2 denote drain ports. The electromagnetic valve V1 is an example of a flow rate control valve.

Figure 3:
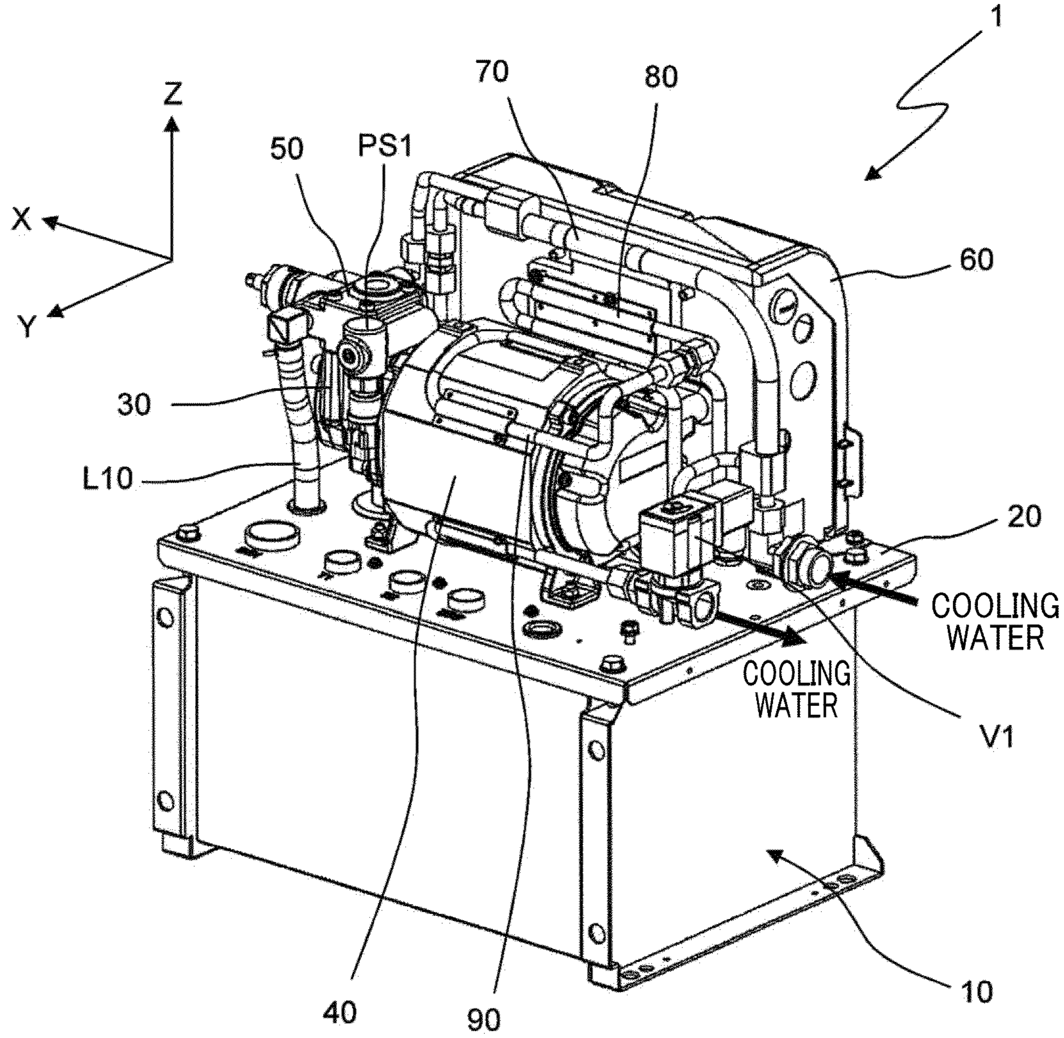
FIG. 3 is a perspective view of the hydraulic unit according to the first embodiment with first and second protection covers removed.
Figure 4:
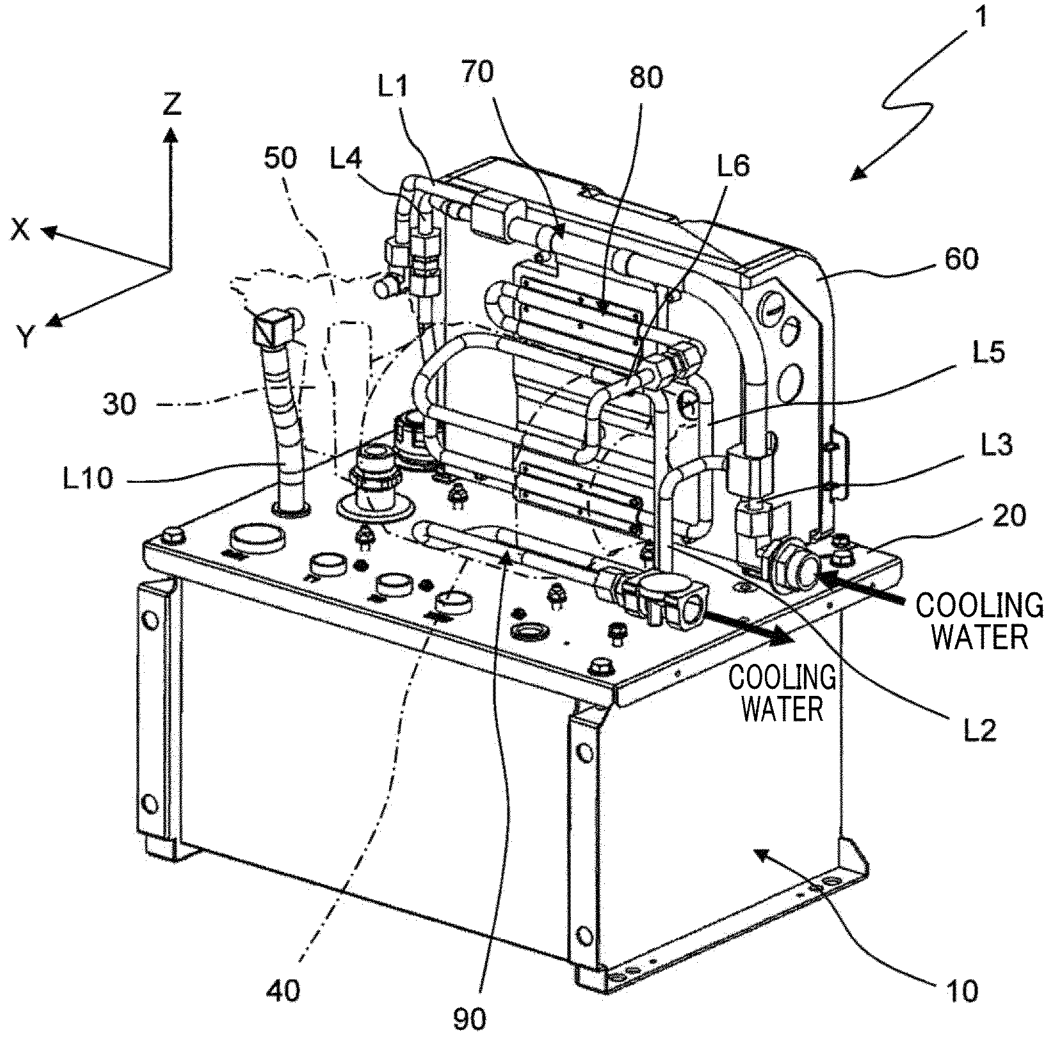
FIG. 4 is a perspective view of the hydraulic unit according to the first embodiment with the first and second protection covers, a motor, a hydraulic pump, and the like removed.

FIG. 3 is a perspective view of the hydraulic unit 1 with the first and second protection covers 11 and 12 removed, and FIG. 4 is a perspective view of the hydraulic unit 1 with the first and second protection covers 11 and 12, the motor 40, the hydraulic pump 30, and the like removed. In FIGS. 3 and 4, 90 denotes a third heat exchanger that is in thermal contact with a housing 40*a* of the motor 40, and V1 denotes the electromagnetic valve.

Figure 5:
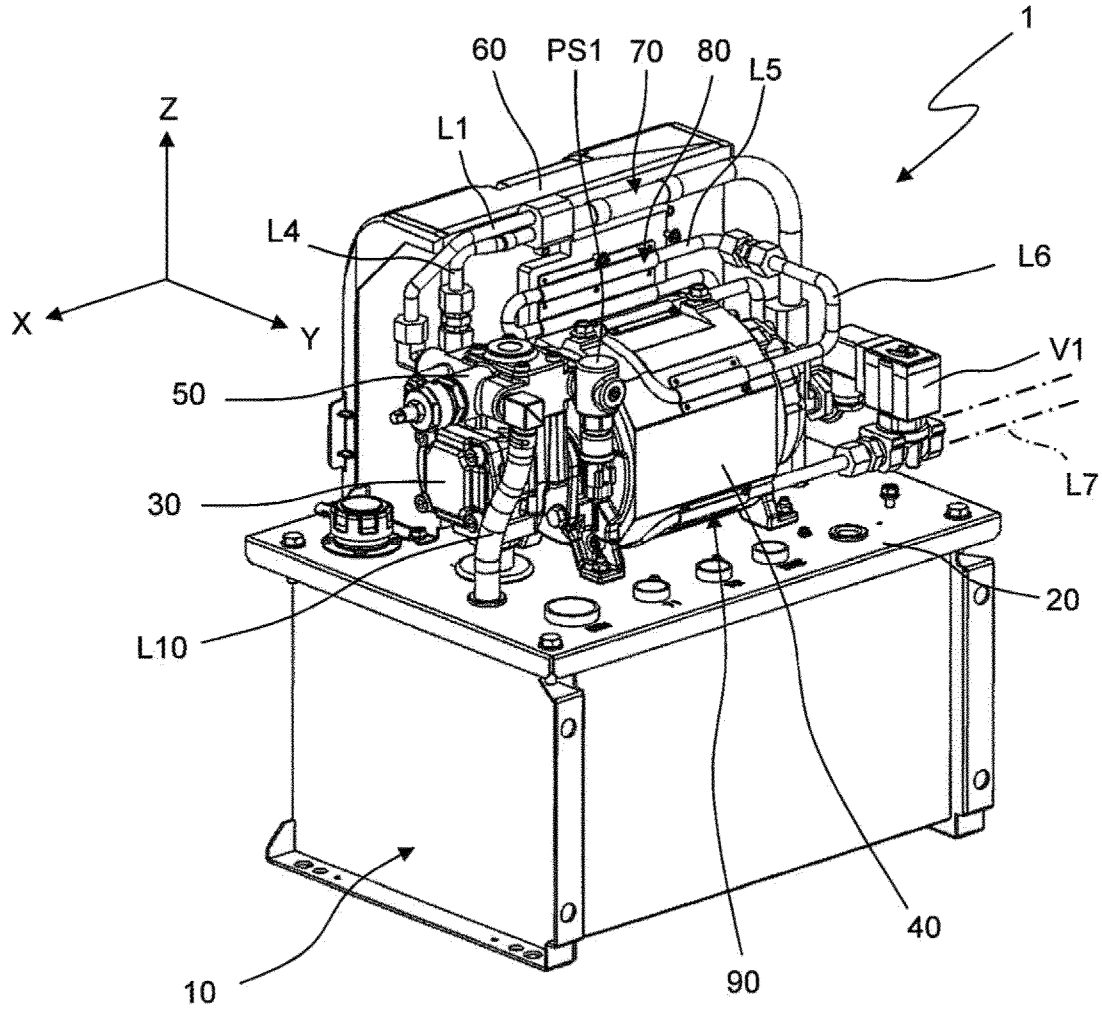
FIG. 5 is a perspective view of the hydraulic unit according to the first embodiment with the first and second protection covers removed, as viewed from the rear side and obliquely from above.
Figure 6:
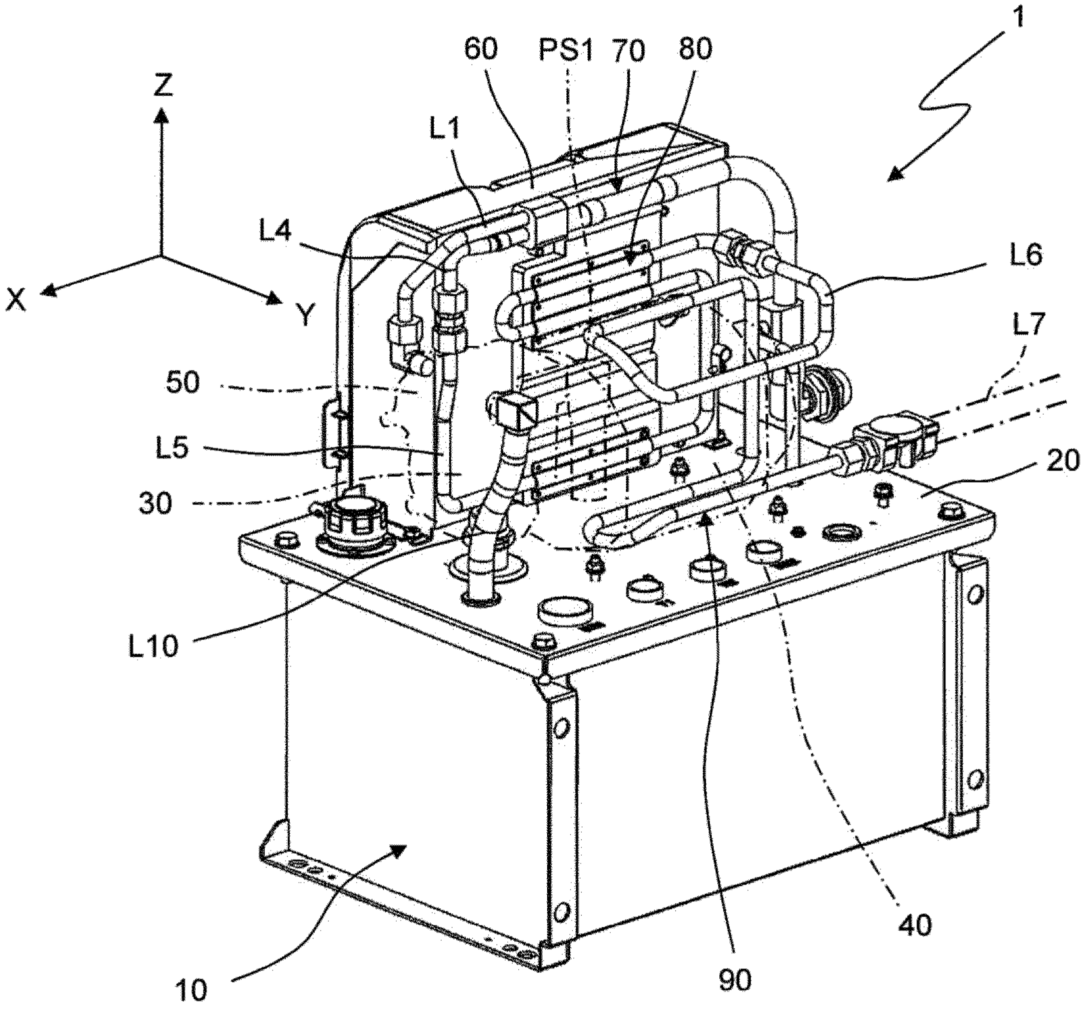
FIG. 6 is a perspective view of the hydraulic unit according to the first embodiment with the first and second protection covers, the motor, the hydraulic pump, and the like removed.

FIG. 5 is a perspective view of the hydraulic unit 1 with the first and second protection covers 11 and 12 removed, as viewed from the rear side and obliquely from above, and FIG. 6 is a perspective view of the hydraulic unit 1 with the first and second protection covers 11 and 12, the motor 40, the hydraulic pump 30, and the like removed. In FIGS. 5 and 6, L7 denotes a drain pipe connected to an outlet of the electromagnetic valve V1.

Figure 7:
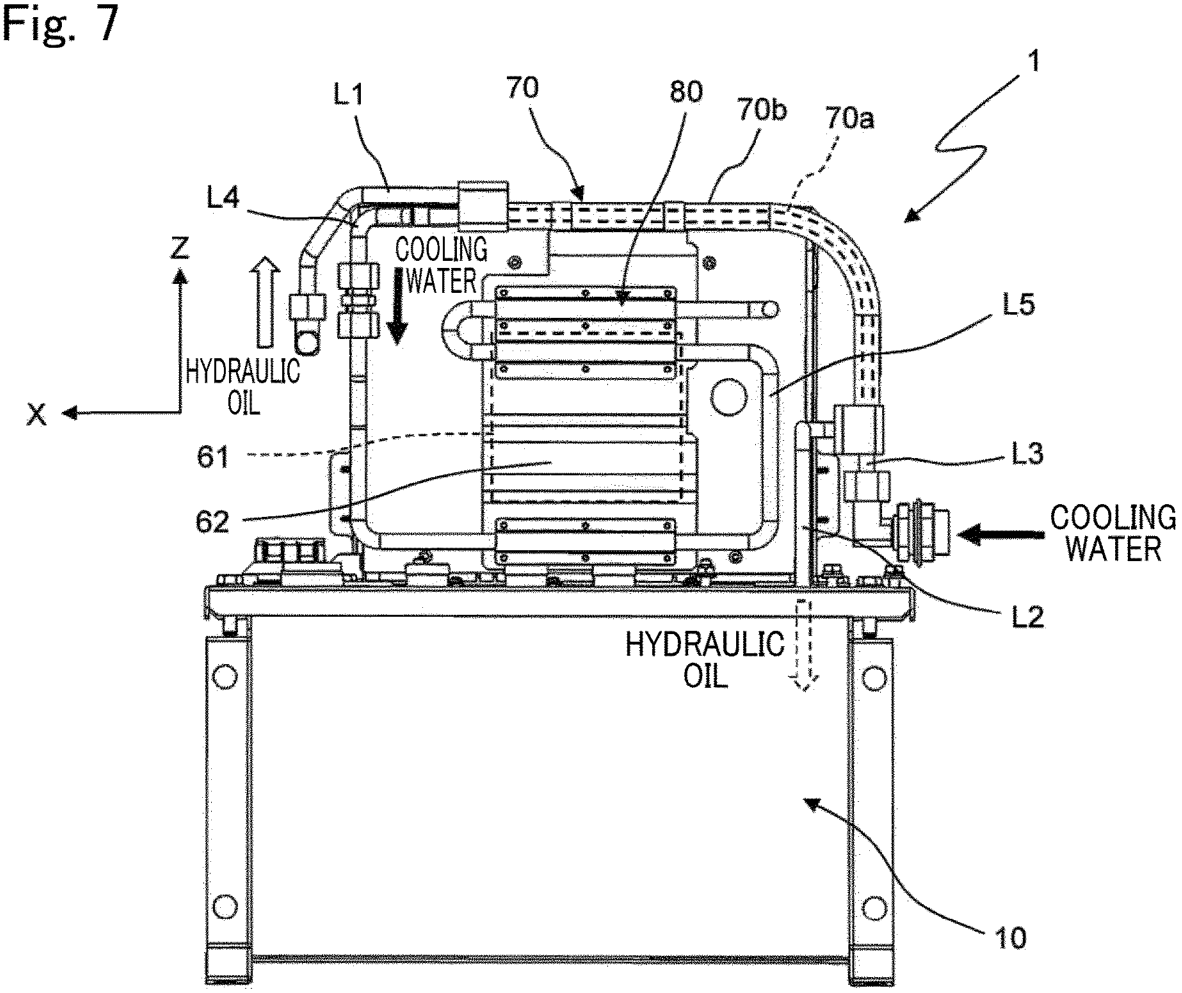
FIG. 7 is a rear view of the hydraulic unit according to the first embodiment with the first and second protection covers, the motor, the hydraulic pump, and the like removed.

FIG. 7 is a rear view of the hydraulic unit 1 with the first and second protection covers 11 and 12, the motor 40, the hydraulic pump 30, and the like removed. For simplicity, the third heat exchanger 90 is not illustrated in FIG. 7.

First Heat Exchanger 70

As illustrated in FIGS. 2 to 7, the first heat exchanger 70 cools the hydraulic oil by causing cooling water to exchange heat with the hydraulic oil returning to the oil tank 10 through pipes L1 and L2. The pipes L1 and L2 are examples of a first return pipe.

Second Heat Exchanger 80

The controller 60 includes a device (an element, a part, or a component) 61 of an inverter circuit (not illustrated) and a heat sink 62 thermally coupled to the device 61, the device 61 driving the motor 40. A pipe L5 into which the cooling water flows from a pipe L4 is in thermal contact with the heat sink 62. The pipe L5 and the heat sink 62 constitute a second heat exchanger 80. The controller 60 includes a central processing unit (CPU), a memory, and an input/output circuit. The device 61 is a power semiconductor such as an insulated gate bipolar transistor (IGBT).

Third Heat Exchanger 90

The cooling water from the second heat exchanger 80 flows into a pipe L6 that is in thermal contact with the housing 40*a* of the motor 40. The pipe L6 and the housing 40*a* of the motor 40 constitute the third heat exchanger 90.

Flow of Hydraulic Oil

In the first heat exchanger 70, the hydraulic oil from the hydraulic pump 30 flows into a flow path between an outer peripheral surface of an inner pipe 70*a* and an inner peripheral surface of an outer pipe 70*b* through the pipe L1. The hydraulic oil returns from the flow path to the oil tank 10 through the pipe L2.

Flow of Cooling Water

The cooling water supplied from an external supply source flows into the inner pipe 70*a* of the first heat exchanger 70 through the pipe L3. The cooling water from the inner pipe 70*a* flows out through the pipe L4. Alternatively, the cooling water may flow between the outer peripheral surface of the inner pipe 70*a* and the inner peripheral surface of the outer pipe 70*b* of the first heat exchanger 70.

Next, the cooling water from the pipe L4 flows into the pipe L5 of the second heat exchanger 80 to cause the second heat exchanger 80 to cool the heat sink 62 of the controller 60. Accordingly, the device 61 thermally coupled to the heat sink 62 is cooled.

Next, the cooling water from the second heat exchanger 80 flows into the pipe L6 of the third heat exchanger 90 to cause the third heat exchanger 90 to cool the motor 40. Then, the cooling water from the third heat exchanger 90 is discharged to the outside through the electromagnetic valve V1 and the drain pipe L7.

The cooling water given herein is an example of a coolant, and in this embodiment, industrial water is used. As the coolant, for example, cooling water supplied from a cooling water circulation device or the like may be used.

Figure 8A:
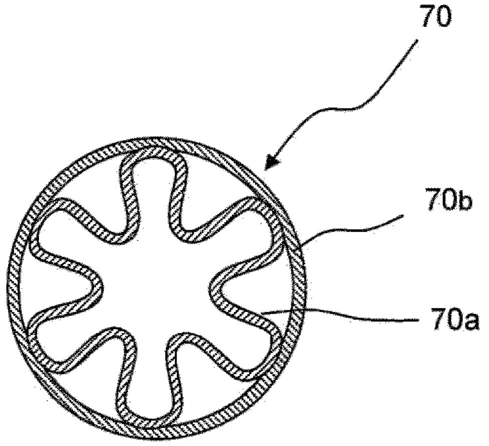
FIG. 8A is a cross-sectional view of a first heat exchanger of the hydraulic unit according to the first embodiment.

As illustrated in FIG. 8A, the first heat exchanger 70 is a double pipe including an inner pipe 70*a* with a multi-lobed cross section and an outer pipe 70*b* with a circular cross section that accommodates the inner pipe 70*a*. Here, the inner pipe 70*a* with a multi-lobed cross section is twisted so as to increase heat exchange efficiency. In this embodiment, the first heat exchanger 70 has a longitudinal dimension of 300 mm, and the inner pipe 70*a* is twisted at intervals of 300 mm to 600 mm.

Figure 8B:
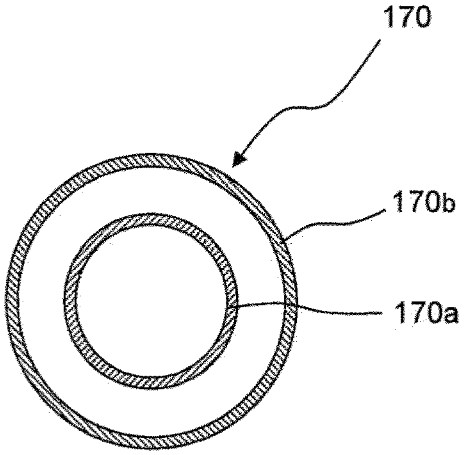
FIG. 8B is a cross-sectional view of a first heat exchanger according to another example of the first embodiment.

Alternatively, as illustrated in FIG. 8B, there may be provided a first heat exchanger 170 of double-pipe structure including an inner pipe 170*a* with a circular cross section and an outer pipe 170*b* with a circular cross section that accommodates the inner pipe 170*a*, and the first heat exchange unit may be a plate heat exchanger or the like.

Figure 9:
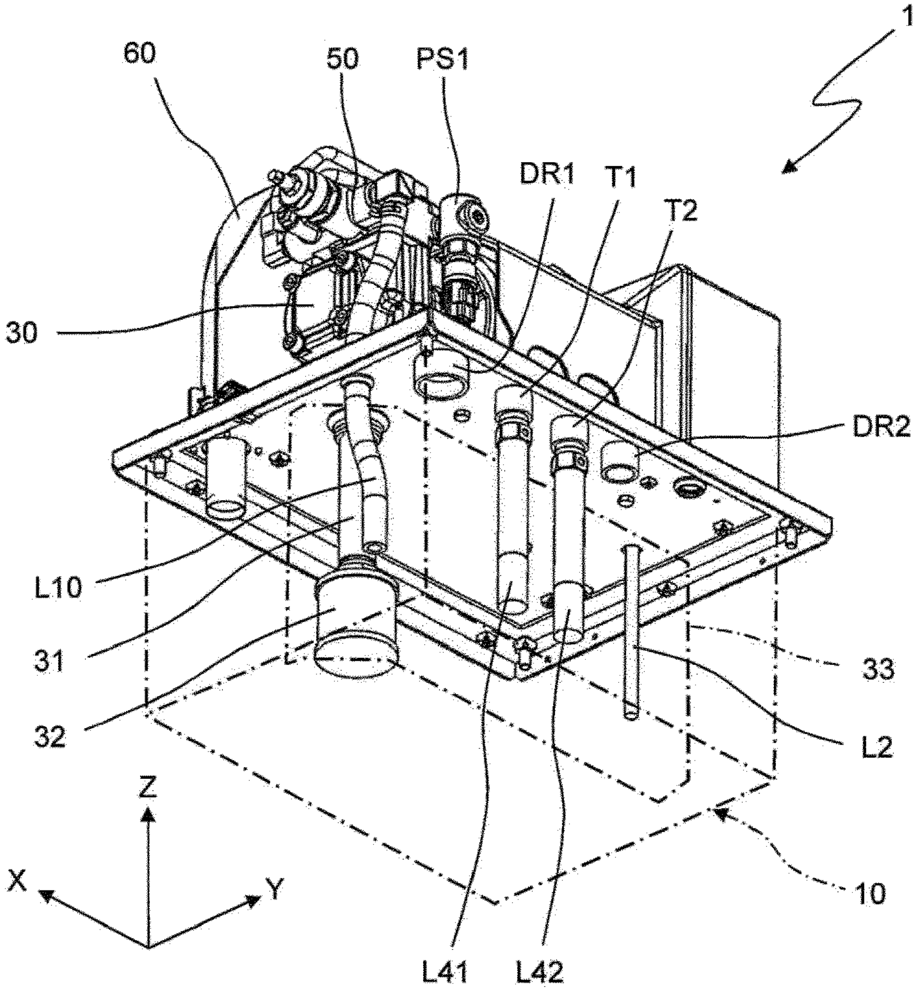
FIG. 9 is a perspective view of the hydraulic unit according to the first embodiment as viewed from the rear side and obliquely below.

FIG. 9 is a perspective view of the hydraulic unit 1 as viewed from the rear side and obliquely below. In FIG. 9, 31 denotes a suction pipe 31 having an upper end connected to an inlet port of the hydraulic pump 30, 32 denotes a suction strainer attached to a lower end of the suction pipe 31, and 33 denotes a partition wall. L41 denotes a pipe having an upper end connected to the tank port T1, and L42 denotes a pipe having an upper end connected to the tank port T2.

Figure 10:
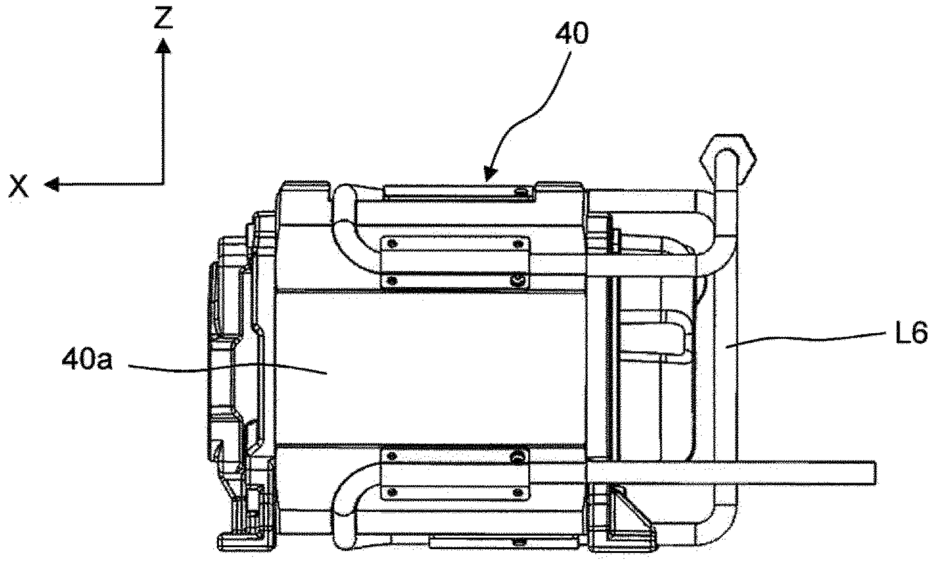
FIG. 10 is a side view of the motor of the hydraulic unit according to the first embodiment.
Figure 11:
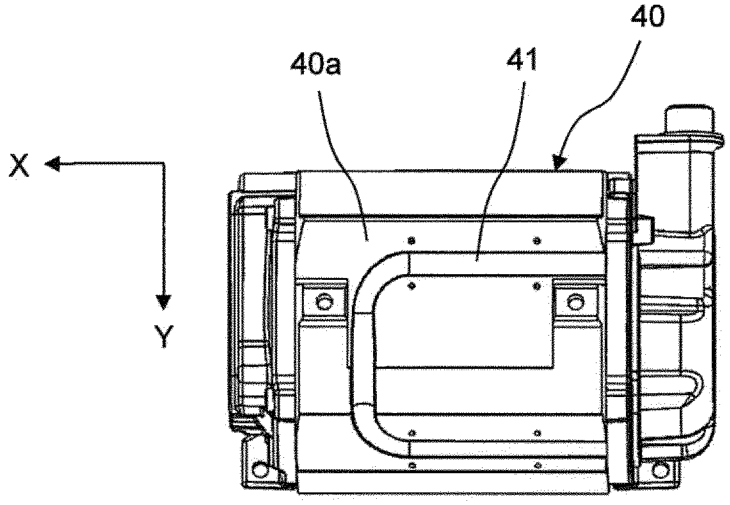
FIG. 11 is a top view of the motor with a pipe according to the first embodiment removed.
Figure 12:
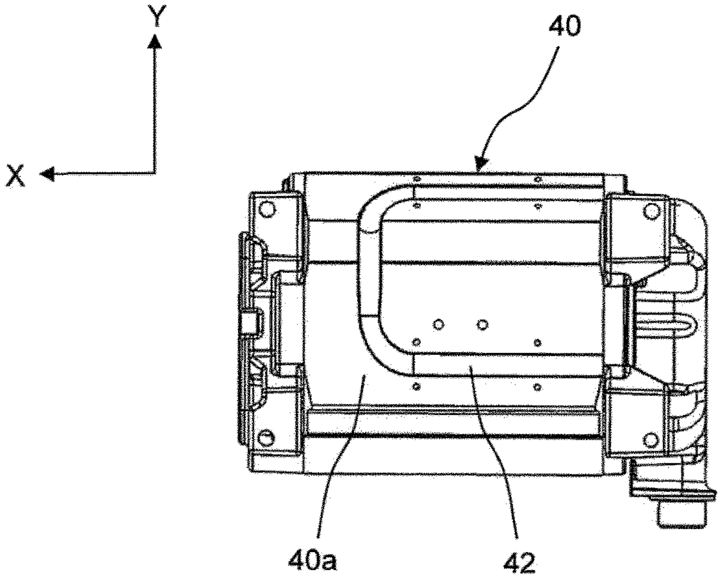
FIG. 12 is a bottom view of the motor with the pipe according to the first embodiment removed.

FIG. 10 is a side view of the motor 40 of the hydraulic unit 1, FIG. 11 is a top view of the motor 40 with the pipe L6 removed, and FIG. 12 is a bottom view of the motor with the pipe L6 removed.

As illustrated in FIG. 10, the pipe L6 meanders and is in thermal contact with the housing 40*a* of the motor 40. As illustrated in FIG. 11, a U-shaped groove 41 in which the pipe L6 is partially fitted is provided in an upper portion of the housing 40*a*. As illustrated in FIG. 12, a U-shaped groove 42 in which the pipe L6 is partially fitted is provided in the bottom portion of the housing 40*a*. The pipe L6 is fixed to the grooves 41 and 42 of the housing 40*a* using heat transfer cement. The pipe L6 is fitted in the grooves 41 and 42 of the housing 40*a* of the motor 40 to increase a contact area between the housing 40*a* of the motor 40 and the pipe L6, so as to increase the heat exchange efficiency.

Figure 13:
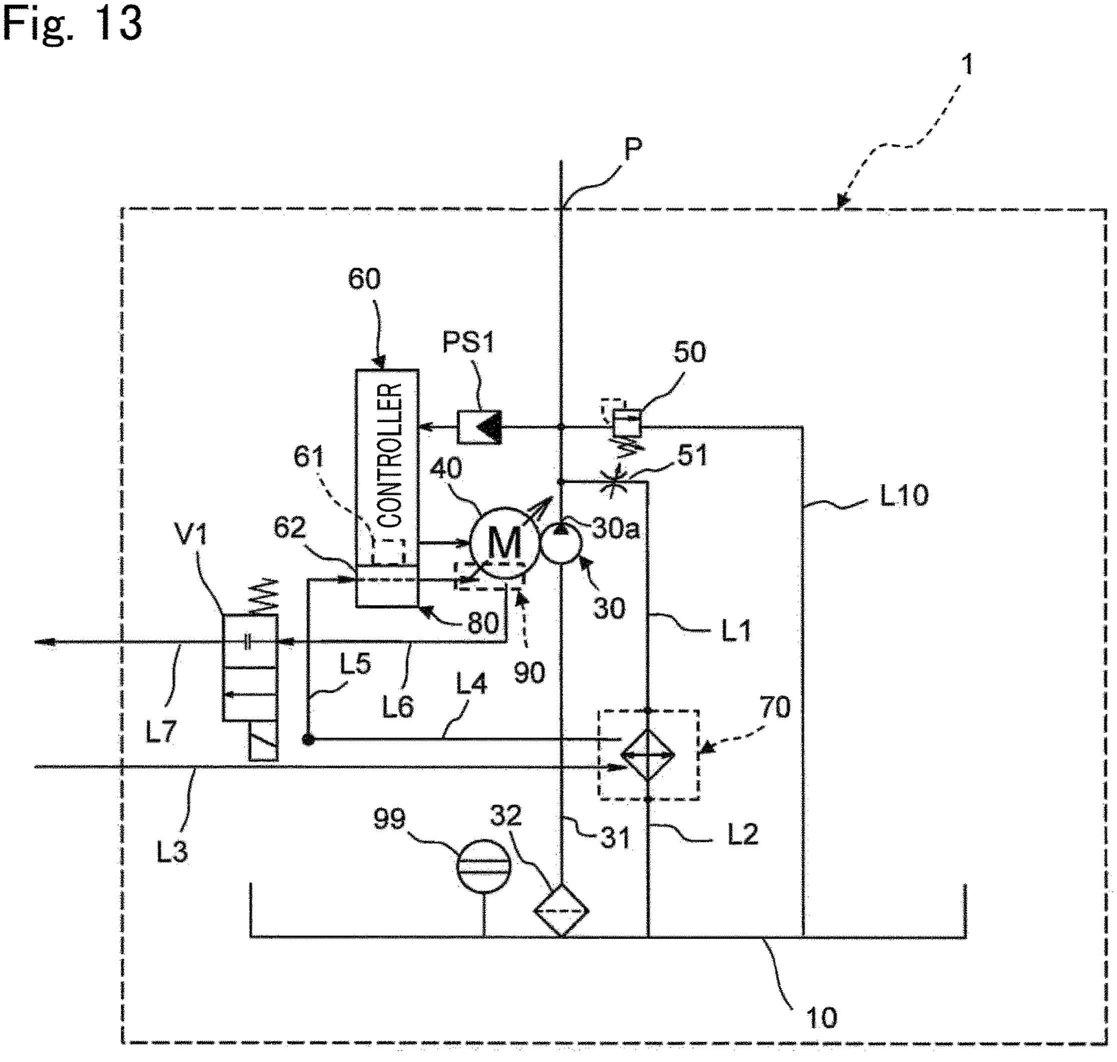
FIG. 13 is a circuit diagram of the hydraulic unit according to the first embodiment.

FIG. 13 is a circuit diagram of the hydraulic unit 1. As illustrated in FIG. 13, the hydraulic unit 1 includes the hydraulic pump 30 of a fixed displacement type, the motor 40 of a variable speed type, the relief valve 50, a pressure sensor PS1, the controller 60, and the oil tank 10. The hydraulic pump 30 supplies the hydraulic oil to an actuator (for example, a hydraulic cylinder) belonging to the main machine. The motor 40 drives the hydraulic pump 30. The relief valve 50 is connected to the discharge port 30*a* of the hydraulic pump 30. The pressure sensor PS1 detects a discharge pressure of the hydraulic pump 30. The controller 60 controls the number of rotations of the motor 40. The oil tank 10 stores the hydraulic oil.

The hydraulic unit 1 has the pump port P connected to the main machine through a pipe (not illustrated). Although not illustrated, the hydraulic unit 1 has a tank ports T1 and T2 connected to the main machine through pipes. The hydraulic pump 30 sucks the hydraulic oil in the oil tank 10 through the suction strainer 32 and the suction pipe 31, and discharges the hydraulic oil from the discharge port 30*a*.

The hydraulic oil is returned to the oil tank 10 through the relief valve 50 and the drain hose L10. The hydraulic oil is returned from a flow path between the discharge port 30*a* of the hydraulic pump 30 and the actuator to the oil tank 10 through a throttle 51 and the pipes L1 and L2. The pipes L1 and L2 are examples of the first return pipe.

In the present embodiment, the hydraulic oil is returned to the oil tank 10 through the relief valve 50 and the drain hose L10, or alternatively, the outlet of the relief valve 50 may be connected to the inlet of the hydraulic pump 30 through a pipe.

The controller 60 controls the number of rotations of the motor 40 and opens and closes the electromagnetic valve V1 on the basis of a pressure command signal or a flow rate command signal from the main machine, a pressure signal from the pressure sensor PS1, or the like. In the present embodiment, the hydraulic pump 30 of a fixed displacement type is used, or alternatively, a hydraulic pump of a variable displacement type may be used.

Since how the first heat exchanger 70, the second heat exchanger 80, and the third heat exchanger 90 are connected has been described with reference to FIGS. 6 and 7, no description will be given below of the connection.

In FIG. 13, the electromagnetic valve V1 is in a closed state. When opened by the controller 60, the cooling water supplied from the external supply source flows into the first heat exchanger 70, the second heat exchanger 80, and the third heat exchanger 90 in this order to cool the hydraulic oil, the device 61, and the motor 40. Then, the cooling water from the third heat exchanger 90 is discharged to the outside through the electromagnetic valve V1.

With the hydraulic unit 1 configured as described above, when the hydraulic oil is returned from a flow path between the discharge port 30*a* of the hydraulic pump 30 and the actuator to the oil tank 10 through the pipes L1 and L2 (first return pipe), the first heat exchanger 70 causes the coolant to exchange heat with the hydraulic oil returning to the oil tank 10 through the pipes L1 and L2. Therefore, it is possible to increase performance of cooling the hydraulic oil even under an environment where the ambient temperature is high.

The first heat exchanger 70 of double-pipe structure includes the inner pipe 70*a*with a multi-lobed cross section and the outer pipe 70*b* accommodating the inner pipe 70*a*. Thus, the use of the first heat exchanger 70 allows an increase in the performance of cooling the hydraulic oil in the first heat exchanger 70 that can be downsized.

The second heat exchanger 80 causes the coolant to exchange heat with the device 61 that drives the motor 40, so that it is possible to increase performance of cooling the device 61 as compared with air cooling.

The third heat exchanger 90 causes the coolant to exchange heat with the motor 40 that drives the hydraulic pump 30, so that it is possible to increase performance of cooling the motor 40 as compared with air cooling.

The first heat exchanger 70 can cool the hydraulic oil, and the second and third heat exchangers 80 and 90 can cool the device 61 and the motor 40. It is further possible to simplify, by connecting the first heat exchanger 70, the second heat exchanger 80, and the third heat exchanger 90 in series, a piping configuration for the coolant. It is further possible to cause the electromagnetic valve V1 (flow rate control valve)

to simultaneously regulate the flow rate of the coolant supplied to the first heat exchanger 70, the second heat exchanger 80, and the third heat exchanger 90. The first heat exchanger 70, the second heat exchanger 80, and the third heat exchanger 90 are connected in series in the order of the first heat exchanger 70, the second heat exchanger 80, and the third heat exchanger 90.

The first heat exchanger 70 first cools the hydraulic oil to increase the temperature of the coolant so that the second and third heat exchangers 80 and 90 have temperatures at which the device 61 and the motor 40 are prevented from suffering from water condensation. Closing the electromagnetic valve V1 (flow rate control valve) prevents the cooling water from flowing to the second and third heat exchangers 80 and 90, so that it is possible to prevent the device 61 and the motor 40 from suffering from water condensation due to excessive cooling.

The hydraulic unit 1 includes a first temperature sensor (not illustrated) that detects the temperature of the hydraulic oil in the oil tank 10, a second temperature sensor (not illustrated) that detects the temperature of the device 61, and a third temperature sensor (not illustrated) that detects the temperature of the motor 40. The controller 60 can optimize the flow rate of the coolant flowing through the first heat exchanger 70, the second heat exchanger 80, and the third heat exchanger 90 by controlling to open and close the electromagnetic valve V1 in accordance with the temperature of the hydraulic oil detected by the first temperature sensor, the temperature of the device 61 detected by the second temperature sensor, and the temperature of the motor 40 detected by the third temperature sensor. Here, the electromagnetic valve V1 is controlled on the basis of pulse width modulation (PWM) control. Alternatively, the third temperature sensor may detect the temperature of the housing 40*a* of the motor 40, the temperature of a coil, or the like.

The above-described hydraulic unit 1 can realize liquid cooling of the hydraulic oil, the device 61 of the controller 60, and the motor 40 while suppressing the occurrence of water condensation with a size equivalent to the size of a known air-cooled hydraulic unit.

In this embodiment, the flow rate of the coolant supplied to the first heat exchanger 70, the second heat exchanger 80, and the third heat exchanger 90 is regulated by the electromagnetic valve V1, or alternatively, a flow rate control valve capable of controlling the opening degree continuously or in multiple levels may be used instead of the electromagnetic valve V1. In this case, the opening degree of the flow rate control valve is controlled in accordance with the temperature of the hydraulic oil, the temperature of the device 61, and the temperature of the motor 40.

Figure 14:
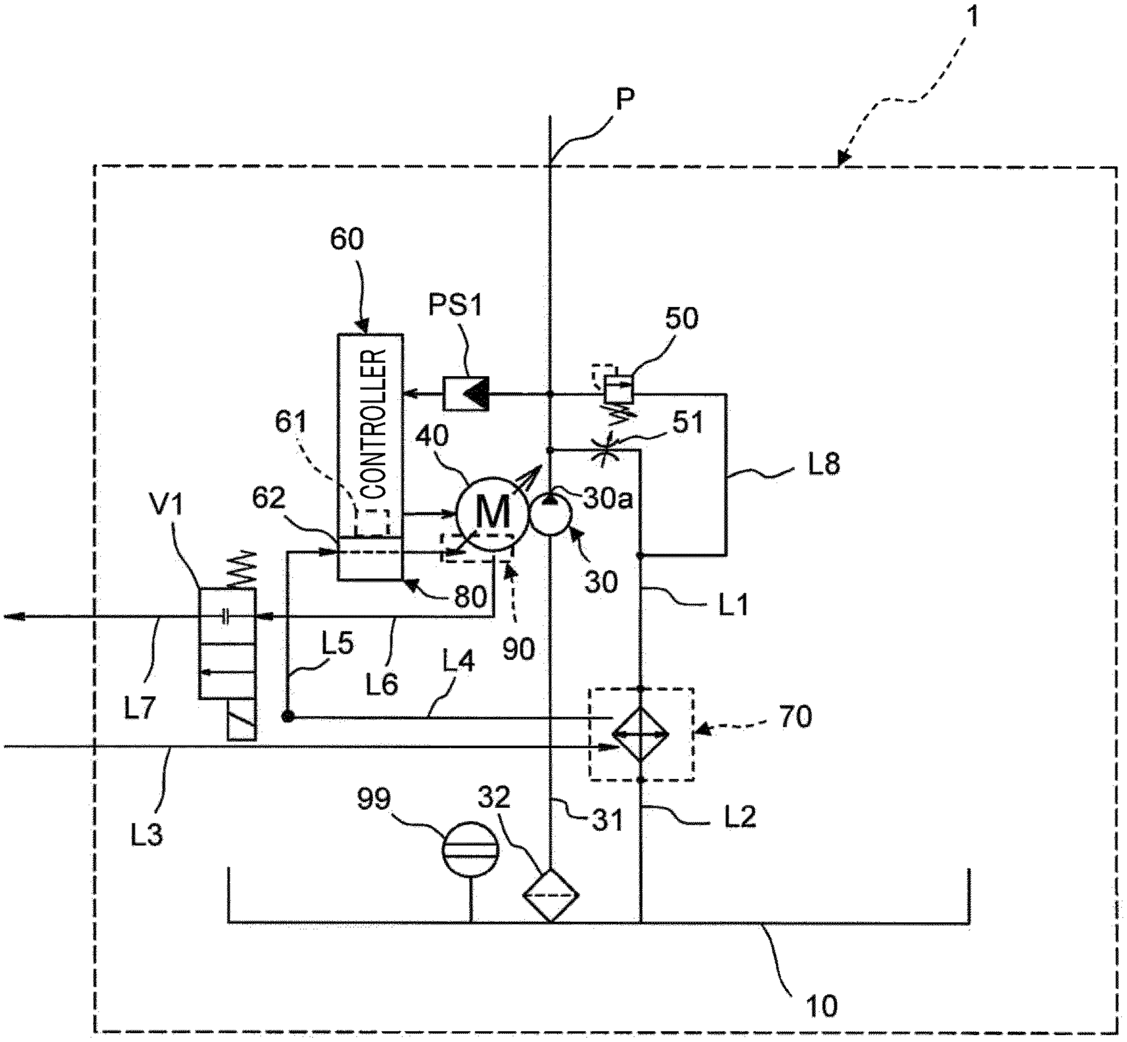
FIG. 14 is a circuit diagram of a hydraulic unit according to a modification of the first embodiment.

Alternatively, as illustrated in FIG. 14, instead of the drain hose L10, the outlet of the relief valve 50 may be connected to one end of a pipe L8, and the pipe L1 may be connected to the other end of the pipe L8. This causes the hydraulic oil from the relief valve 50 and the hydraulic oil from the throttle 51 to merge with and be cooled by the first heat exchanger 70. The pipe L8 is an example of the first return pipe.

In FIG. 14, when the hydraulic oil is returned from the flow path between the discharge port 30*a* of the hydraulic pump 30 and the actuator to the oil tank 10 through the relief valve 50, the first heat exchanger 70 causes the coolant to exchange heat with the hydraulic oil returning to the oil tank 10 through the pipe L8, so that it is possible to further increase the performance of cooling the hydraulic oil. Since the first heat exchanger 70 of double-pipe configuration has no joint and thus has high strength as compared with an oil cooler of the known air-cooled hydraulic unit, the first heat exchanger 70 can cool the hydraulic oil flowing through the pipe L8. Here, the pipe L8 is a flow path in which surge pressure is generated.

Figure 15:
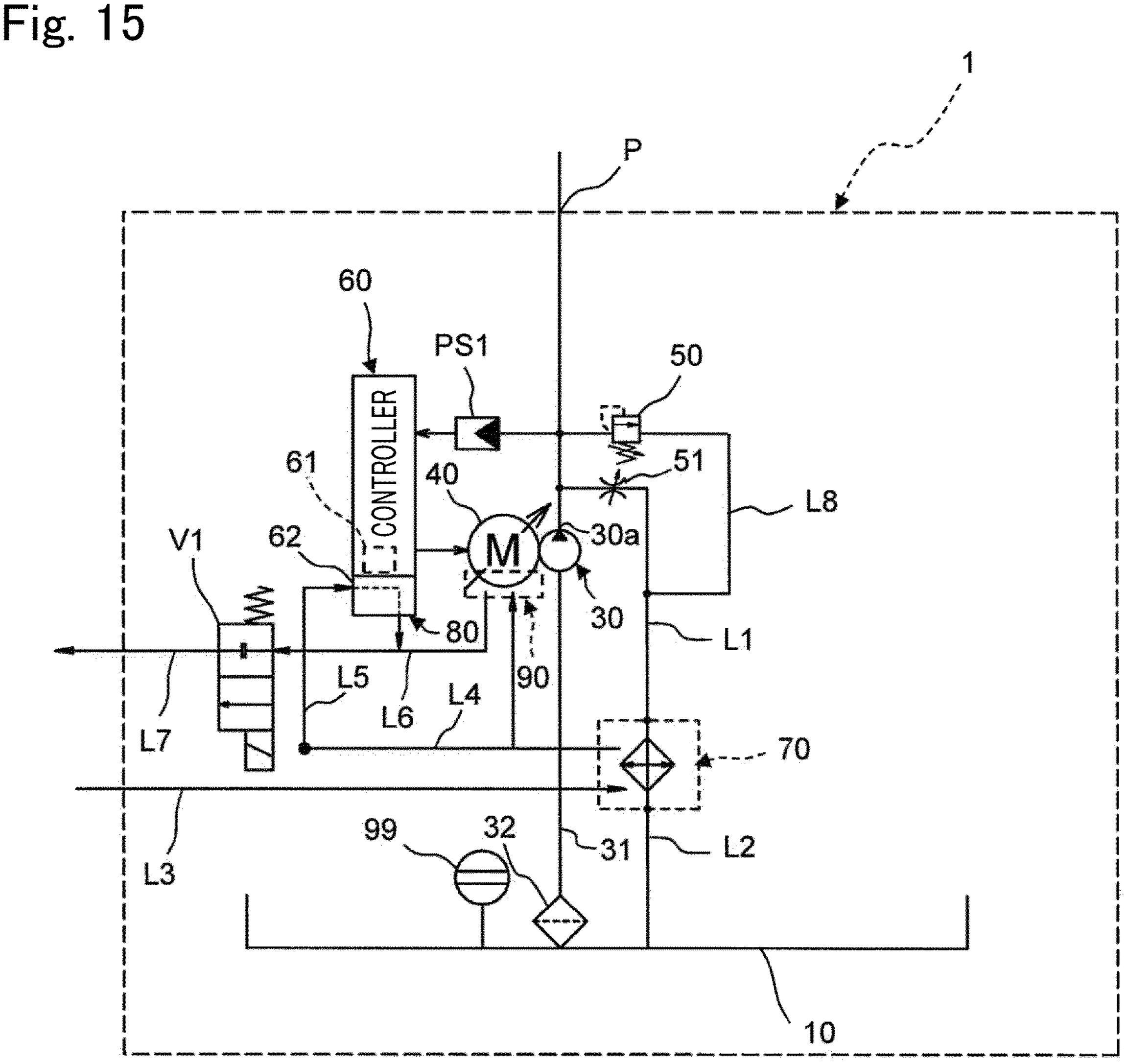
FIG. 15 is a circuit diagram of the hydraulic unit according to the modification of the first embodiment.

Alternatively, as illustrated in FIG. 15, the second heat exchanger 80 and the third heat exchanger 90 may be connected in parallel, and the first heat exchanger 70 may be connected in series to the second heat exchanger 80 and the third heat exchanger 90 connected in parallel.

Second Embodiment

Figure 16:
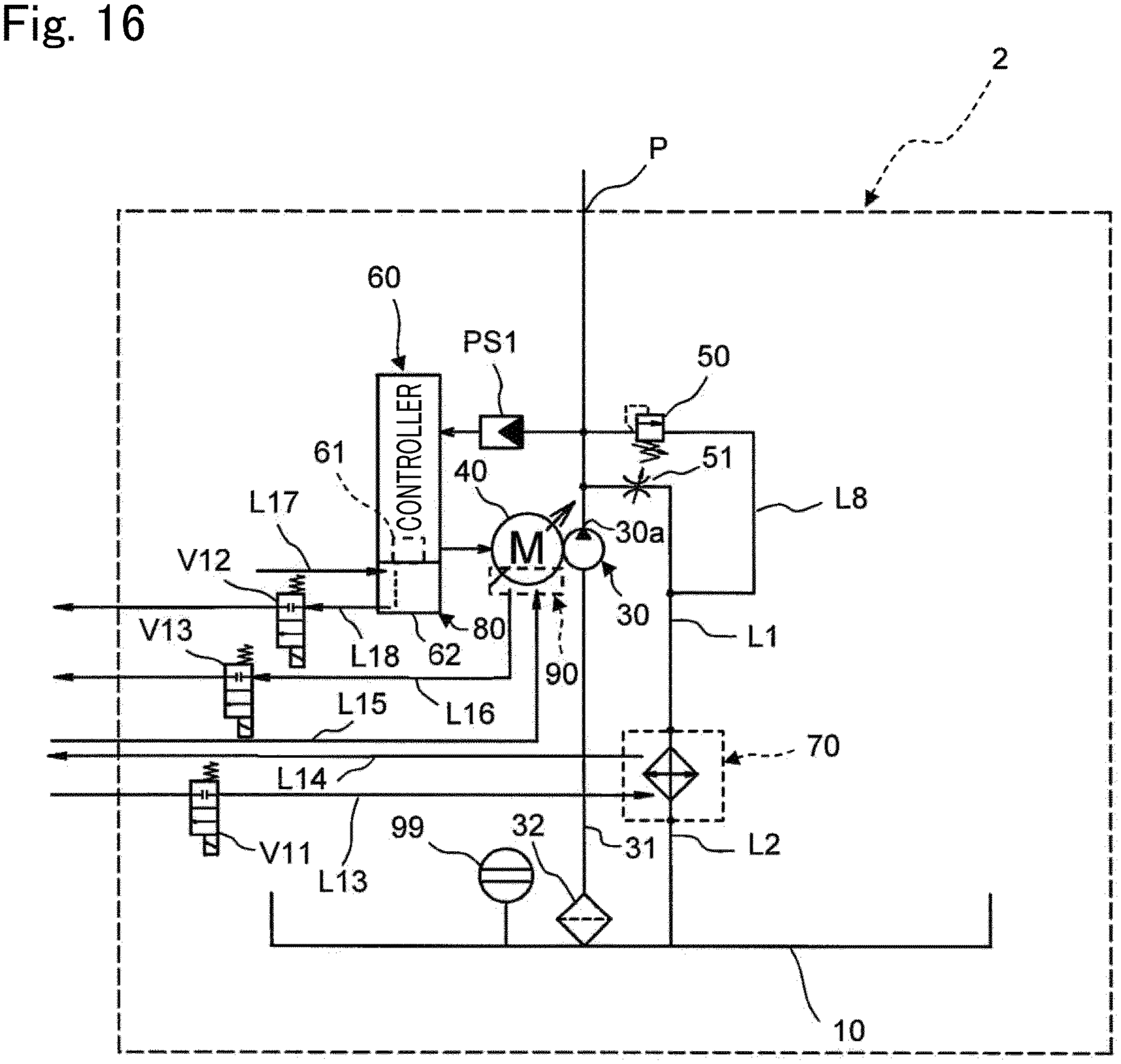
FIG. 16 is a circuit diagram of a hydraulic unit according to a second embodiment of the present disclosure.

FIG. 16 is a circuit diagram of a hydraulic unit 2 according to a second embodiment of the present disclosure. The hydraulic unit 2 according to the second embodiment is identical in configuration to the hydraulic unit 1 illustrated in FIG. 14 as a modification of the first embodiment except for the connection configuration of the first heat exchanger 70, the second heat exchanger 80, and the third heat exchanger 90, and electromagnetic valves V11, V12, and V13.

In the hydraulic unit 1 according to the first embodiment illustrated in FIGS. 13 and 14, the first heat exchanger 70, the second heat exchanger 80, and the third heat exchanger 90 are connected in series; on the other hand, in the hydraulic unit 2 according to the second embodiment, the first heat exchanger 70, the second heat exchanger 80, and the third heat exchanger 90 are not connected in series. The hydraulic unit 2 includes the electromagnetic valve V11 (first flow rate control valve) that controls the flow rate of the coolant supplied to the first heat exchanger 70, the electromagnetic valve V12 (second flow rate control valve) that controls the flow rate of the coolant supplied to the second heat exchanger 80, and the electromagnetic valve V13 (third flow rate control valve) that controls the flow rate of the coolant supplied to the third heat exchanger 90.

The cooling water supplied from the external supply source flows into the first heat exchanger 70 through the electromagnetic valve V11 and a pipe L13, and flows out from the first heat exchanger 70 through a pipe L14.

The cooling water supplied from the external supply source flows into the second heat exchanger 80 through a pipe L17, and flows out from the second heat exchanger 80 through a pipe L18 and the electromagnetic valve V12.

The cooling water supplied from the external supply source flows into the third heat exchanger 90 through a pipe L15, and flows out from the third heat exchanger 90 through a pipe L16 and the electromagnetic valve V13.

The hydraulic unit 2 according to the second embodiment has the same effect as the hydraulic unit 1 of the first embodiment has. The electromagnetic valve V11 can regulate the flow rate of the coolant supplied to the first heat exchanger 70, the electromagnetic valve V12 can regulate the flow rate of the coolant supplied to the second heat exchanger 80, and the electromagnetic valve V13 can regulate the flow rate of the coolant supplied to the third heat exchanger 90.

The hydraulic unit 2 includes a first temperature sensor (not illustrated) that detects the temperature of the hydraulic oil in the oil tank 10, a second temperature sensor (not illustrated) that detects the temperature of the device 61, and a third temperature sensor (not illustrated) that detects the temperature of the motor 40. The controller 60 can optimize the flow rate of the coolant flowing through the first heat exchanger 70, the second heat exchanger 80, and the third heat exchanger 90 by controlling to open and close the electromagnetic valve V11, V12, and V13 in accordance with the temperature of the hydraulic oil detected by the first temperature sensor, the temperature of the device 61 detected by the second temperature sensor, and the temperature of the motor 40 detected by the third temperature sensor.

Specifically, the controller 60 can keep the hydraulic oil at an appropriate temperature by controlling the electromagnetic valve V11 (first flow rate control valve) to regulate the flow rate of the coolant flowing through the first heat exchanger 70, so as to make a temperature To of the hydraulic oil higher than or equal to a predetermined first hydraulic oil temperature To1 and lower than or equal to a predetermined second hydraulic oil temperature To2 (>To1). The controller 60 can keep the device 61 at an appropriate temperature by controlling the electromagnetic valve V12 (second flow rate control valve) to regulate the flow rate of the coolant flowing through the second heat exchanger 80, so as to make a temperature Td of the device 61 higher than or equal to a predetermined first device temperature Td1 and lower than or equal to a predetermined second device temperature Td2 (>Td1). The controller 60 can keep the motor 40 at an appropriate temperature by controlling the electromagnetic valve V13 (third flow rate control valve) to regulate the flow rate of the coolant flowing through the third heat exchanger 90, so as to make a temperature Tm of the motor 40 higher than or equal to a predetermined first motor temperature Tm1 and lower than or equal to a predetermined second motor temperature Tm2 (>Tm1). Setting the device 61 at the predetermined second device temperature Td2 makes it possible to suppress heat-induced deterioration.

Setting the motor 40 at the predetermined second motor temperature Tm2 makes it possible to suppress heat-induced deterioration.

Here, the first device temperature Td1 is a temperature at which the device 61 is prevented from suffering from water condensation, and the first motor temperature Tm1 is a temperature at which the motor 40 is prevented from suffering from water condensation.

The above-described hydraulic unit 2 according to the second embodiment has the same effect as the hydraulic unit 1 of the first embodiment has.

Third Embodiment

Figure 17:
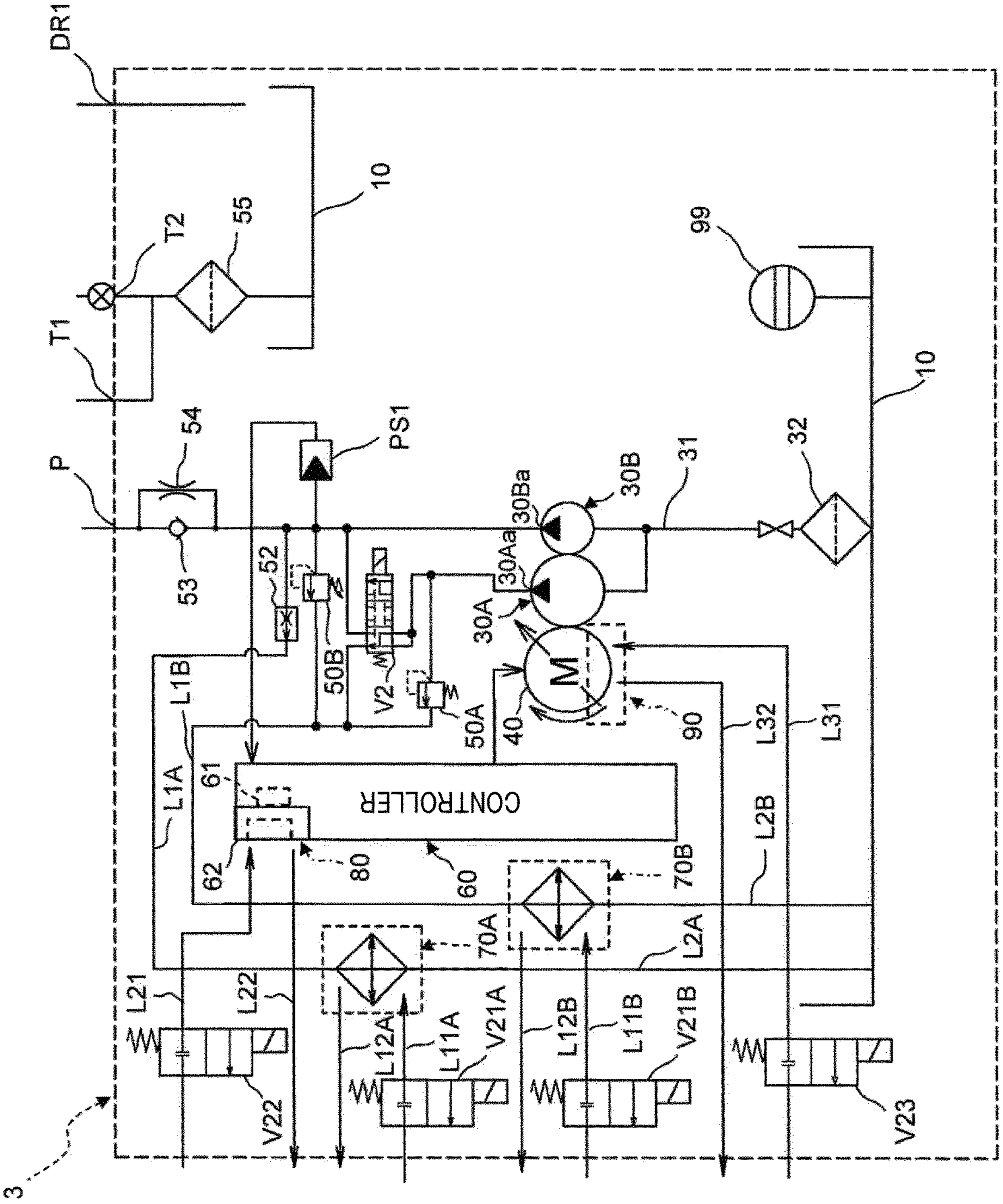
FIG. 17 is a circuit diagram of a hydraulic unit according to a third embodiment of the present disclosure.

FIG. 17 is a circuit diagram of a hydraulic unit 3 according to a third embodiment of the present disclosure. In FIG. 17, 55 denotes a filter.

As illustrated in FIG. 17, the hydraulic unit 3 includes a pair of hydraulic pumps 30A and 30B that supply the hydraulic oil to the actuator (for example, a hydraulic cylinder) belonging to the main machine, the motor 40 of a variable speed type that drives the hydraulic pump 30A and 30B, a relief valve 50A connected to a discharge port 30Aa of the hydraulic pump 30A, a relief valve 50B connected to a discharge port 30Ba of the hydraulic pump 30B, the pressure sensor PS1 that detects a discharge pressure of the hydraulic pumps 30A and 30B, the controller 60 that controls the number of rotations of the motor 40, and the oil tank 10 that stores the hydraulic oil. The hydraulic pump 30A is a large-capacity fixed displacement pump, and the hydraulic pump 30B is a small-capacity fixed displacement pump.

The hydraulic unit 3 includes a flow path switching valve V2 that switches whether the discharge port 30Aa of the hydraulic pump 30A is connected to a pipe close the discharge port 30Ba of the hydraulic pump 30B or the discharge port 30Aa of the hydraulic pump 30A is connected to a pipe L1B. A check valve 53 that regulates the flow of the hydraulic oil toward the hydraulic pump 30B is provided between the discharge port 30Ba of the hydraulic pump 30B and the pump port P. A throttle 54 is connected in parallel to the check valve 53.

The flow path switching valve V2 switches whether to cause the hydraulic pump 30B to solely control the pressure and flow rate at the pump port P or to cause both the hydraulic pump 30A and the hydraulic pump 30B to control the pressure and flow rate at the pump port P.

The pump port P of the hydraulic unit 3 is connected to the main machine through a pipe (not illustrated). The tank ports T1 and T2 of the hydraulic unit 3 is connected to the main machine through pipes (not illustrated). The hydraulic pump 30A sucks the hydraulic oil in the oil tank 10 through the suction strainer 32 and the suction pipe 31, and discharges the hydraulic oil from the discharge port 30Aa. The hydraulic pump 30B sucks the hydraulic oil in the oil tank 10 through the suction strainer 32 and the suction pipe 31, and discharges the hydraulic oil from the discharge port 30Ba. The suction pipe 31 branches off at its upper side to connect to the respective inlet ports of the hydraulic pumps 30A and 30B.

The hydraulic oil is returned from a flow path between the discharge port 30Aa of the hydraulic pump 30A and the actuator to the oil tank 10 through the relief valve 50A, the pipe L1B, a heat exchanger 70B, and a pipe L2B. The hydraulic oil is returned from a flow path between the discharge port 30Ba of the hydraulic pump 30B and the actuator to the oil tank 10 through the relief valve 50B, the pipe L1B, the heat exchanger 70B, and the pipe L2B. The hydraulic oil is returned from a flow path between the discharge port 30Ba of the hydraulic pump 30B and the actuator to the oil tank 10 through a throttle 52, a pipe L1A, a heat exchanger 70A, and a pipe L2A. The pipes L1A, L1B, L2A, and L2B are examples of the first return pipe. The heat exchangers 70A and 70B are examples of the first heat exchanger.

The cooling water supplied from the external supply source flows into the heat exchanger 70A through an electromagnetic valve V21A and a pipe L11A, and flows out from the heat exchanger 70A through a pipe L12A. The cooling water supplied from the external supply source flows into the heat exchanger 70B through an electromagnetic valve V21B and a pipe L11B, and flows out from the heat exchanger 70B through a pipe L12B.

The cooling water supplied from the external supply source flows into the second heat exchanger 80 through an electromagnetic valve V22 and a pipe L21, and flows out from the second heat exchanger 80 through a pipe L22.

The cooling water supplied from the external supply source flows into the third heat exchanger 90 through an electromagnetic valve V23 and a pipe L31, and flows out from the third heat exchanger 90 through a pipe L32.

The controller 60 controls the number of rotations of the motor 40 and opens and closes the electromagnetic valve V21A, V21B, V22, or V23 on the basis of the pressure command signal or the flow rate command signal from the main machine, the pressure signal from the pressure sensor PS1, or the like. In the present embodiment, the hydraulic pumps 30A and 30B of a fixed displacement type is used, or alternatively, a hydraulic pump of a variable displacement type may be used.

With the hydraulic unit configured as described above, when the hydraulic oil is returned from a flow path between the discharge ports 30Aa and 30Ba of the hydraulic pumps 30A and 30B and the actuator to the oil tank 10 through the pipes L1A, L1B, L2A, and L2B (first return pipes), the heat exchangers 70A and 70B (first heat exchanger) cause the coolant to exchange heat with the hydraulic oil returning to the oil tank 10 through the pipes L1A, L1B, L2A, and L2B. Thus, it is possible to increase the performance of cooling the hydraulic oil even under an environment where the ambient temperature is high. Since the heat exchangers 70A and 70B (first heat exchanger) of double-pipe configuration have no joint and thus have high strength as compared with the oil cooler of the known air-cooled hydraulic unit, the heat exchanger 70B can cool the hydraulic oil flowing through the pipe L1B, which is a flow path in which surge pressure is generated.

It is possible to increase the heat exchange efficiency of the heat exchangers 70A and 70B (first heat exchanger) and further increase the performance of cooling the hydraulic oil by using, for the heat exchangers 70A and 70B, a double pipe increasing the inner pipe 70*a* with a multi-lobed cross section and the outer pipe 70*b* accommodating the inner pipe 70*a* illustrated in FIG. 8A.

The second heat exchanger 80 causes the coolant to exchange heat with the device 61 that drives the motor 40, so that it is possible to increase the performance of cooling the device 61 as compared with air cooling.

The third heat exchanger 90 causes the coolant to exchange heat with the motor 40 that drives the hydraulic pumps 30A and 30B, so that it is possible to increase the performance of cooling the motor 40 as compared with air cooling.

The hydraulic unit 3 according to the third embodiment can cause the electromagnetic valve V21A (first flow rate control valve) to regulate the flow rate of the coolant supplied to the heat exchanger 70A, cause the electromagnetic valve V21B (first flow rate control valve) to regulate the flow rate of the coolant supplied to the heat exchanger 70B, cause the electromagnetic valve V22 (second flow rate control valve) to regulate the flow rate of the coolant supplied to the second heat exchanger 80, and cause the electromagnetic valve V23 (third flow rate control valve) to regulate the flow rate of the coolant supplied to the third heat exchanger 90.

The hydraulic unit 3 includes a first temperature sensor (not illustrated) that detects the temperature of the hydraulic oil in the oil tank 10, a second temperature sensor (not illustrated) that detects the temperature of the device 61, and a third temperature sensor (not illustrated) that detects the temperature of the motor 40. The controller 60 can optimize the flow rate of the coolant flowing through the first heat exchanger 70, the second heat exchanger 80, and the third heat exchanger 90 by controlling to open and close the electromagnetic valves V21A, V21B, V22, and V23 in accordance with the temperature of the hydraulic oil detected by the first temperature sensor, the temperature of the device 61 detected by the second temperature sensor, and the temperature of the motor 40 detected by the third temperature sensor.

Specifically, the controller 60 can keep the hydraulic oil at an appropriate temperature by controlling the electromagnetic valves V21A and V21B (first flow rate control valve) to regulate the flow rate of the coolant flowing through the first heat exchangers 70A and 70B, so as to make the temperature To of the hydraulic oil higher than or equal to the predetermined first hydraulic oil temperature To1 and lower than or equal to the predetermined second hydraulic oil temperature To2 (>To1). The controller 60 can keep the device 61 at an appropriate temperature by controlling the electromagnetic valve V22 to regulate the flow rate of the coolant flowing through the second heat exchanger 80, so as to make the temperature Td of the device 61 higher than or equal to the predetermined first device temperature Td1 and lower than or equal to the predetermined second device temperature Td2 (>Td1). The controller 60 can keep the motor 40 at an appropriate temperature by controlling the electromagnetic valve V22 to regulate the flow rate of the coolant flowing through the third heat exchanger 90, so as to make the temperature Tm of the motor 40 higher than or equal to the predetermined first motor temperature Tm1 and lower than or equal to the predetermined second motor temperature Tm2 (>Tm1).

Here, the first device temperature Td1 is a temperature at which the device 61 is prevented from suffering from water condensation, and the first motor temperature Tm1 is a temperature at which the motor 40 is prevented from suffering from water condensation.

In this embodiment, the flow rate of the coolant supplied to each of the heat exchangers 70A and 70B, the second heat exchanger 80, and the third heat exchanger 90 is regulated by controlling to open and close the electromagnetic valves V21A, V21B, V22, and V23, or alternatively, a flow rate control valve capable of controlling the opening degree continuously or in a multiple levels may be used instead of the electromagnetic valves V21A, V21B, V22, and V23.

Figure 18:
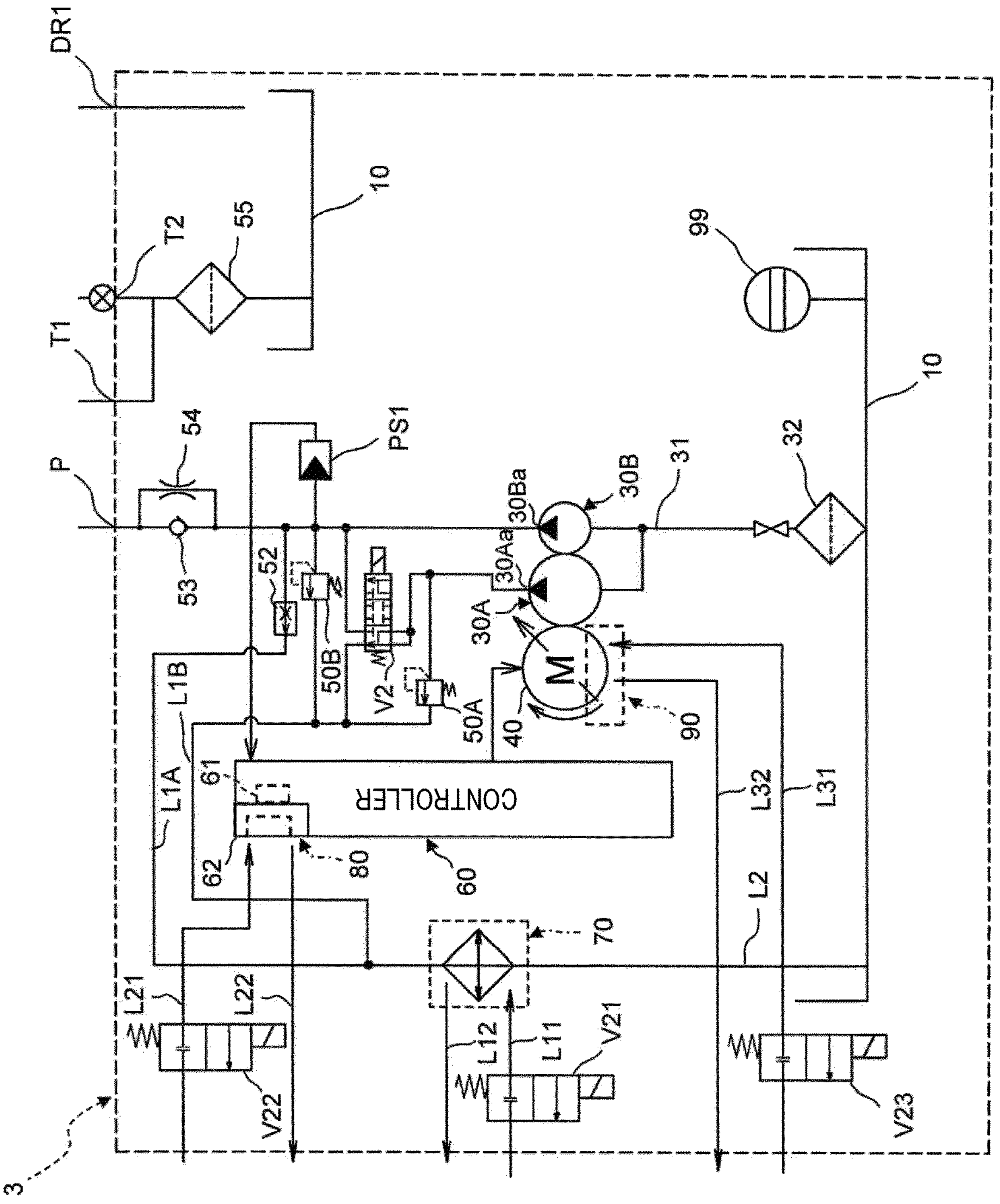
FIG. 18 is a circuit diagram of a hydraulic unit according to a modification of the third embodiment.

In the third embodiment, the two heat exchangers 70A and 70B are used as the first heat exchanger, or alternatively, as illustrated in FIG. 18, the hydraulic oil may be cooled by a single first heat exchanger 70 instead of the heat exchangers 70A and 70B.

In FIG. 18, the hydraulic oil is returned from a flow path between the discharge port 30Aa of the hydraulic pump 30A and the actuator to the oil tank 10 through the relief valve 50A, the pipe L1B, the first heat exchanger 70, and the pipe L2. The hydraulic oil is returned from a flow path between the discharge port 30Ba of the hydraulic pump 30B and the actuator to the oil tank 10 through the relief valve 50B, the pipe L1B, the first heat exchanger 70, and the pipe L2B. The hydraulic oil is returned from a flow path between the discharge port 30Ba of the hydraulic pump 30B and the actuator to the oil tank 10 through the throttle 52, the pipe L1A, the first heat exchanger 70, and the pipe L2. The pipes L1A, L1B, and L2 are examples of the first return pipe.

Fourth Embodiment

Figure 19:
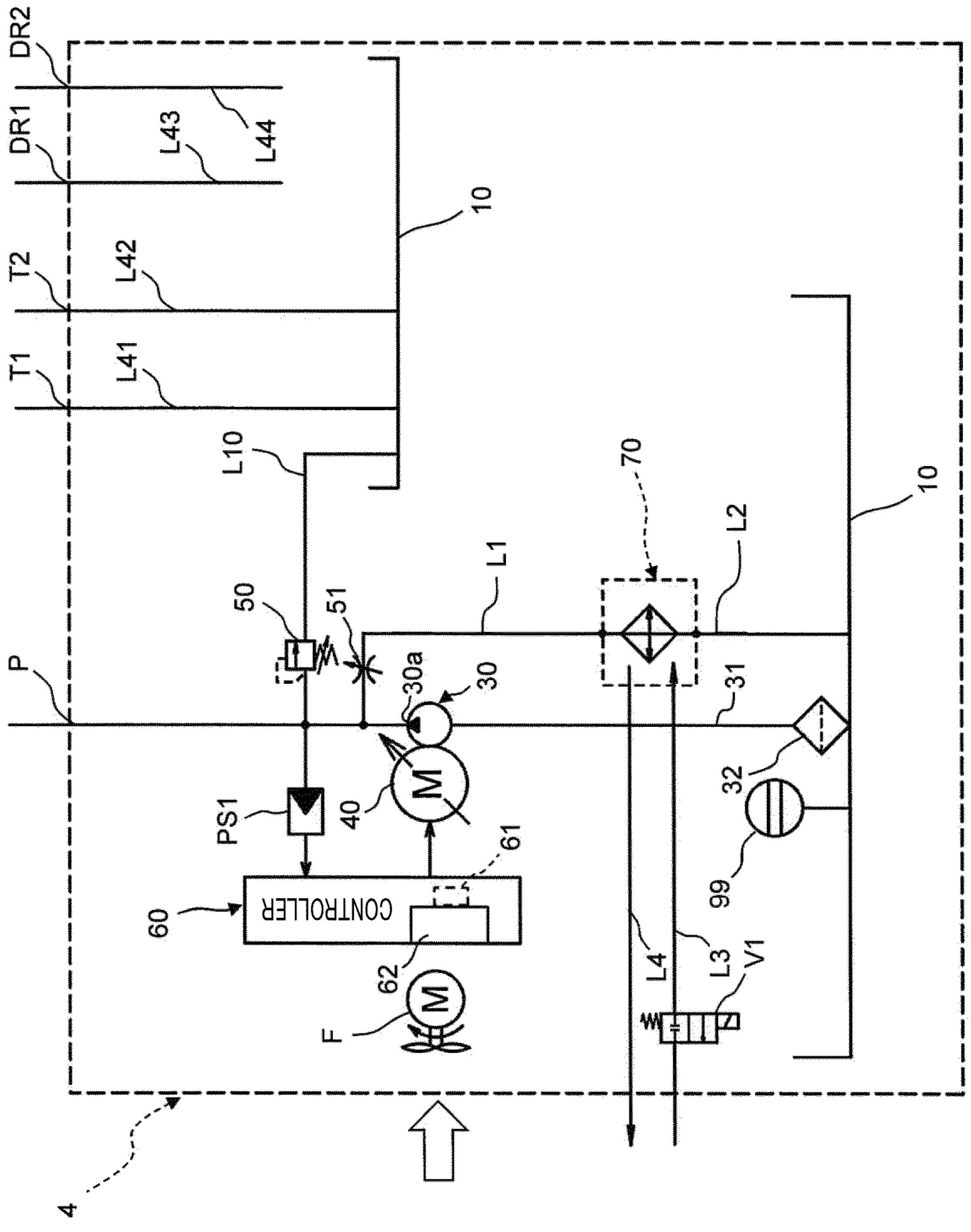
FIG. 19 is a circuit diagram of a hydraulic unit according to a fourth embodiment of the present disclosure.

FIG. 19 is a circuit diagram of a hydraulic unit 4 according to a fourth embodiment of the present disclosure. The hydraulic unit 4 according to the fourth embodiment is identical in configuration to the hydraulic unit 1 according to the first embodiment except that the second and third heat exchangers 80 and 90 are not provided and that a fan F is further provided. In FIG. 19, L41 denotes a pipe that guides the hydraulic oil from the tank port T1 to the oil tank 10, L42 denotes a pipe that guides the hydraulic oil from the tank port T2 to the oil tank 10, L43 denotes a pipe that guides the hydraulic oil from the drain port DR1 to the oil tank 10, and L44 denotes a pipe that guides the hydraulic oil from the drain port DR2 to the oil tank 10.

As illustrated in FIG. 19, the hydraulic unit 4 according to the fourth embodiment includes the fan F that supplies cooling air to both the motor 40 and the heat sink 62 of the controller 60 (control unit). The heat sink 62 is cooled by the air supplied from the fan F so as to cool the device 61 thermally coupled to the heat sink 62.

The hydraulic unit 4 includes a first temperature sensor (not illustrated) that detects the temperature of the hydraulic oil in the oil tank 10. The controller 60 can optimize the flow rate of the coolant flowing through the first heat exchanger 70 by controlling to open and close the electromagnetic valve V1 in accordance with the temperature of the hydraulic oil detected by the first temperature sensor.

Specifically, the controller 60 can keep the hydraulic oil at an appropriate temperature by controlling the electromagnetic valve V1 to regulate the flow rate of the coolant flowing through the first heat exchanger 70, so as to make the temperature To of the hydraulic oil higher than or equal to the predetermined first hydraulic oil temperature To1 and lower than or equal to the predetermined second hydraulic oil temperature To2 (>To1).

In the hydraulic unit 4 configured as described above, both the motor 40 and the device 61 of the controller 60 (control unit) are cooled by the air supplied from the fan F, so that it is possible to make the configuration simple as compared with a case where a heat exchanger for cooling is provided in the motor 40 or the device 61 of the controller 60. Alternatively, either one of the motor 40 and the device 61 of the controller 60 (control unit) may be cooled by the air supplied from the fan F, and the other of the motor 40 and the device 61 of the controller 60 (control unit) may be cooled by liquid in a manner similar to the first to third embodiments.

Figure 20:
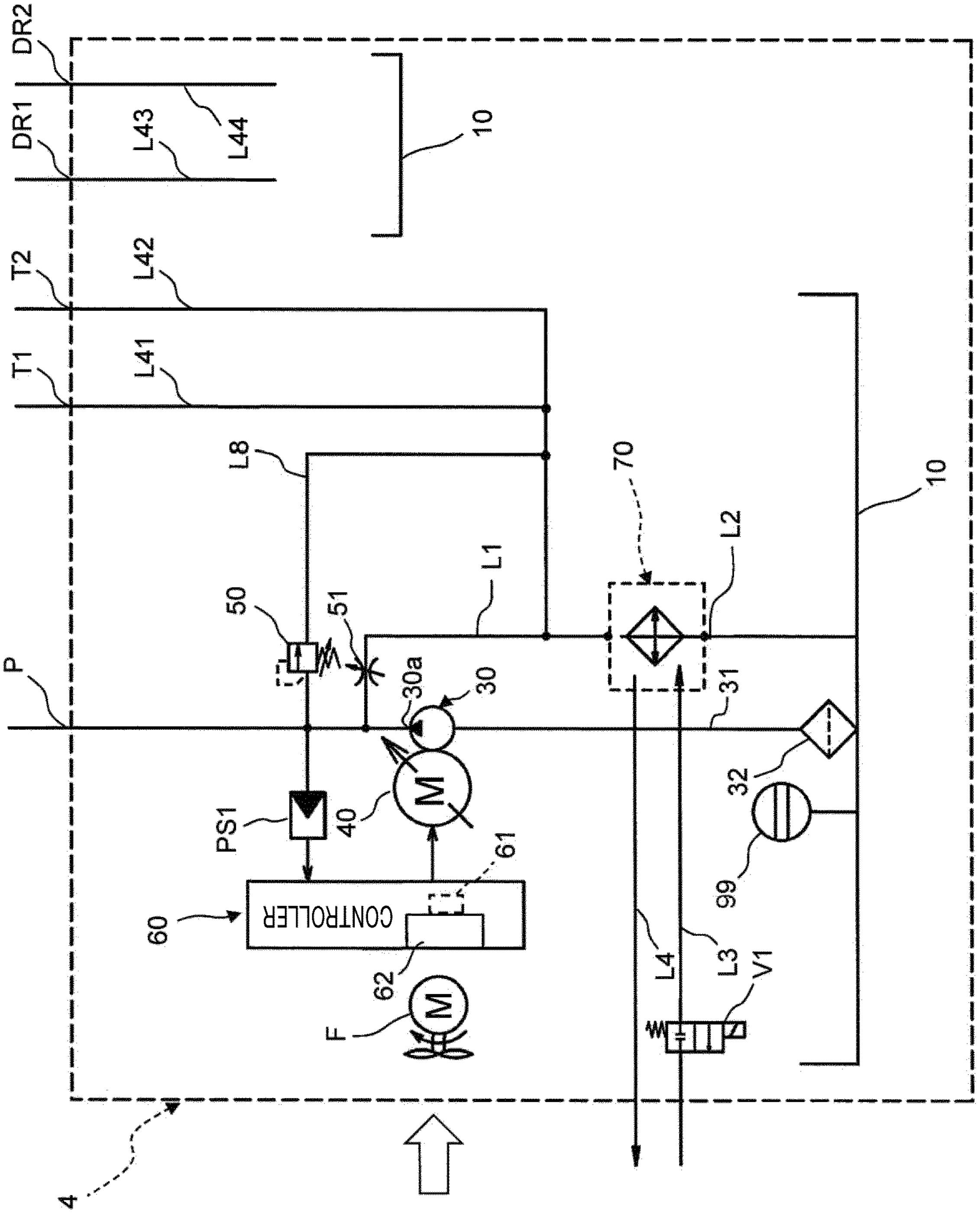
FIG. 20 is a circuit diagram of a hydraulic unit according to a modification of the fourth embodiment.

In the hydraulic unit 4 of the fourth embodiment, the hydraulic oil is returned to the oil tank 10 through the relief valve 50 and the drain hose L10, or alternatively, as illustrated in FIG. 20, the hydraulic oil from the relief valve 50 and the tank ports T1 and T2 may be guided to the first heat exchanger 70 for cooling. In FIG. 20, the pipe L8 has one end connected to the outlet of the relief valve 50 and has the other end connected to the pipe L1, the tank port T1 is connected to the pipe L8 through the pipe L41, and the tank port T2 is connected to the pipe L41 through the pipe L42.

This causes the hydraulic oil from the relief valve 50, the hydraulic oil from the throttle 51, and the hydraulic oil from the tank ports T1 and T2 to merge with each other and be cooled by the first heat exchanger 70. The pipe L8 is an example of the first return pipe, and the pipes L41 and L42 are examples of a second return pipe.

When the hydraulic oil discharged from the actuator is returned to the oil tank 10 through the pipes L41 and L42 (second return pipe), the first heat exchanger 70 causes the coolant to exchange heat with the hydraulic oil returning to the oil tank 10 through the pipes L41 and L42. This causes the first heat exchanger 70 to cool not only the hydraulic oil returning from a flow path between the discharge port 30*a* of the hydraulic pump 30 and the actuator to the oil tank 10 through the relief valve 50 but also the hydraulic oil discharged from the actuator, so that it is possible to further increase the performance of cooling the hydraulic oil.

Figure 21:
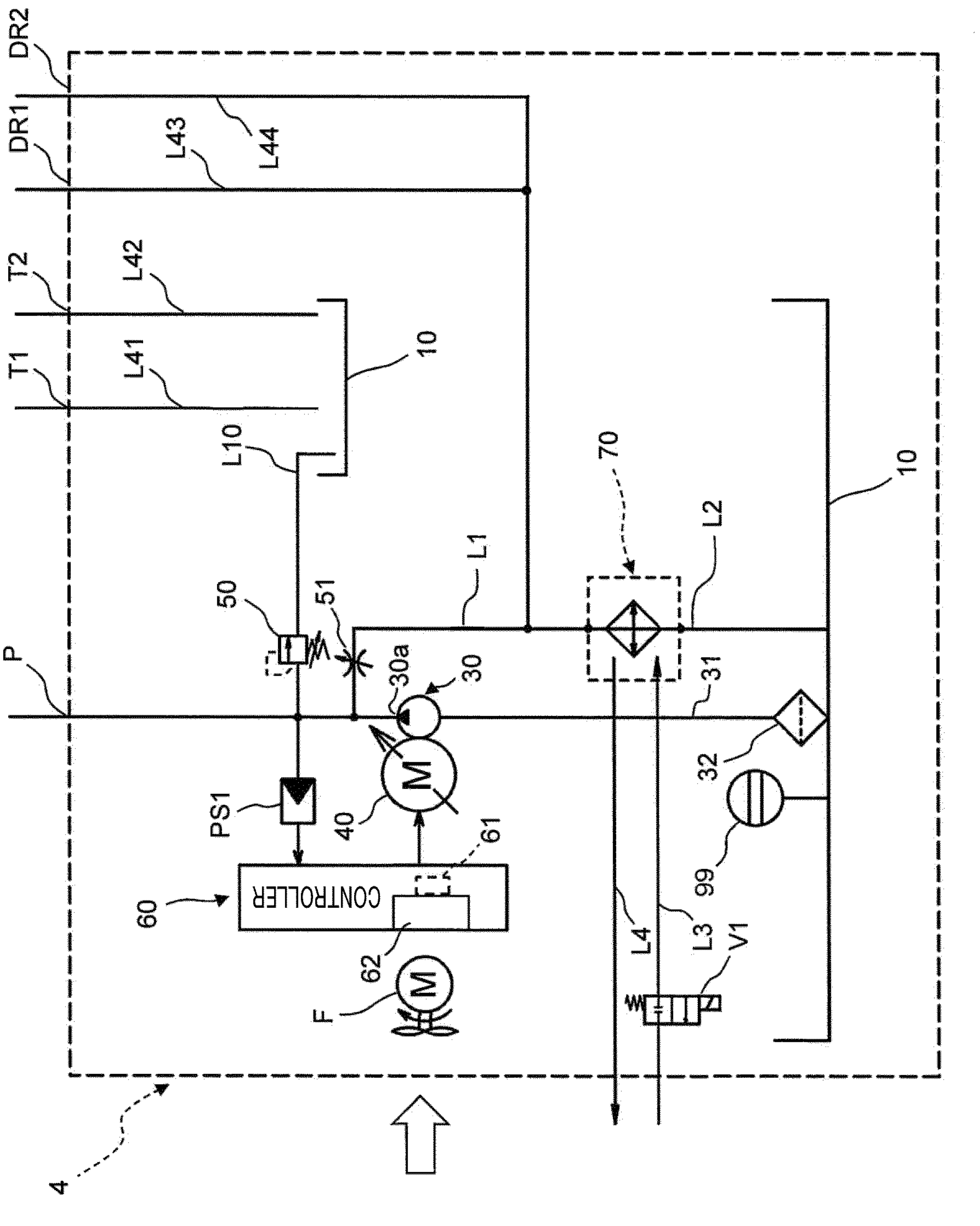
FIG. 21 is a circuit diagram of the hydraulic unit according to the modification of the fourth embodiment.

In the hydraulic unit 4 according to the fourth embodiment, the hydraulic oil is guided from the drain port DR1 to the oil tank 10 through the pipe L43, and the hydraulic oil is guided from the drain port DR2 to the oil tank 10 through the pipe L44, or alternatively, as illustrated in FIG. 21, the hydraulic oil from the drain ports DR1 and DR2 may be guided to the first heat exchanger 70 for cooling. In FIG. 21, the drain port DR1 is connected to the pipe L1 through the pipe L43, and the drain port DR2 is connected to the pipe L43 through the pipe L44.

This causes the first heat exchanger 70 to cool the hydraulic oil from the throttle 51 and cool the hydraulic oil from the drain ports DR1 and DR2. The pipes L1 and L2 are examples of the first return pipe, and the pipes L43 and L 44 are examples of the second return pipe.

Fifth Embodiment

Figure 22:
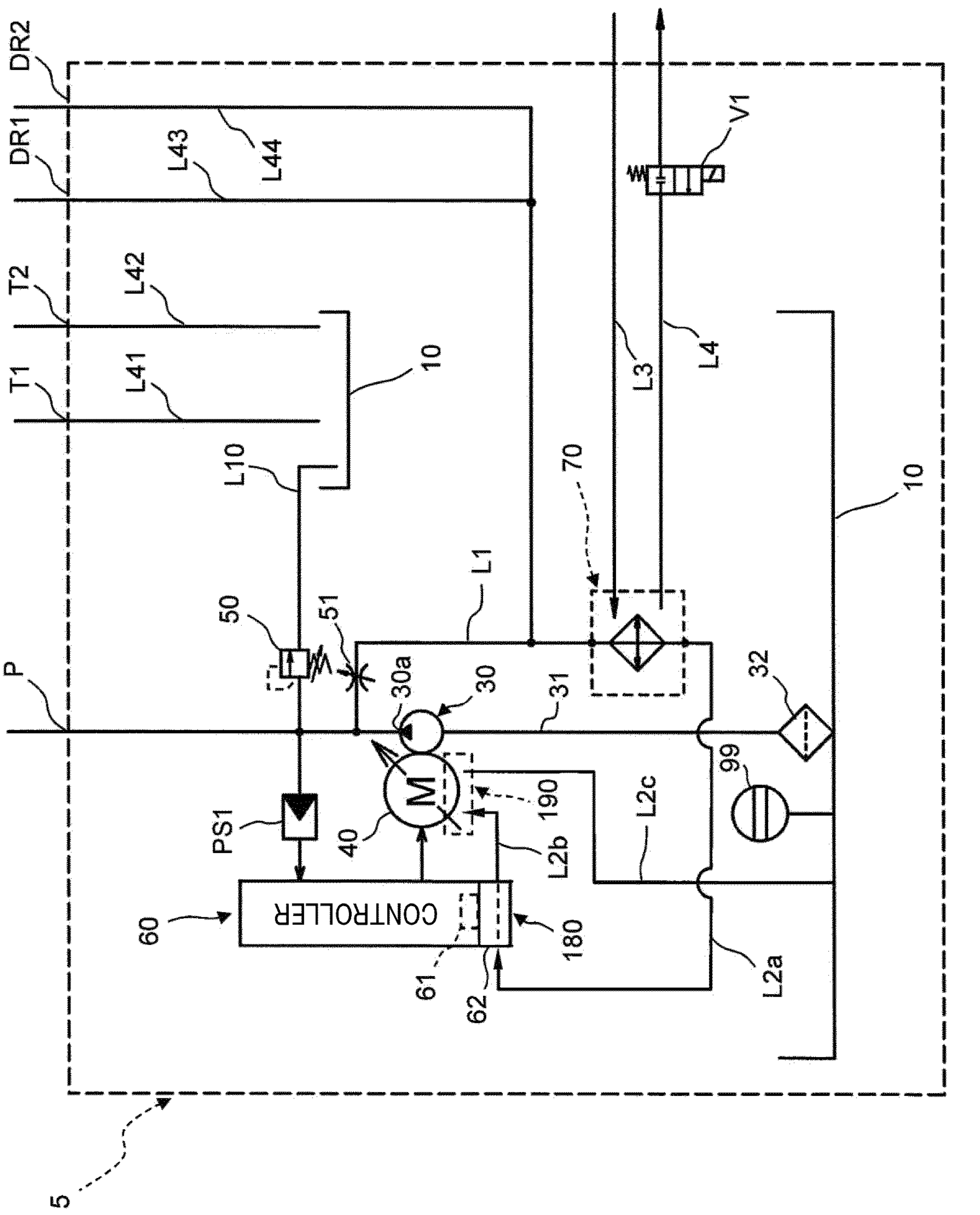
FIG. 22 is a circuit diagram of a hydraulic unit according to a fifth embodiment of the present disclosure.

FIG. 22 is a circuit diagram of a hydraulic unit 5 according to a fifth embodiment of the present disclosure. The hydraulic unit 5 according to the fifth embodiment is identical in configuration to a modification of the hydraulic unit 4, illustrated in FIG. 21, according to the fourth embodiment except that the fan F is not provided and that second and third heat exchangers 180, 190 using the hydraulic oil cooled by the first heat exchanger 70 as a coolant are further provided.

As illustrated in FIG. 22, the hydraulic unit 5 according to the fifth embodiment causes the second heat exchanger 180 to cool the device 61 of the controller 60 with the hydraulic oil cooled by the first heat exchanger 70. The second heat exchanger 180 cools the motor 40 with the hydraulic oil from the second heat exchanger 180. Then, the hydraulic oil from the third heat exchanger 190 returns to the oil tank 10 through a pipe L2*c*. In the present embodiment, the hydraulic oil flows from the second heat exchanger 180 to the third heat exchanger 190 in this order, or alternatively, the hydraulic oil may flow from the third heat exchanger 190 to the second heat exchanger 180 in this order.

The hydraulic unit 5 includes a temperature sensor (not illustrated) that detects the temperature of the hydraulic oil in the oil tank 10. The controller 60 can optimize the flow rate of the coolant flowing through the first heat exchanger 70 by controlling to open and close the electromagnetic valve V1 in accordance with the temperature of the hydraulic oil detected by the temperature sensor.

Specifically, the controller 60 can keep the hydraulic oil at an appropriate temperature by controlling the electromagnetic valve V1 to regulate the flow rate of the coolant flowing through the first heat exchanger 70, so as to make the temperature To of the hydraulic oil higher than or equal to the predetermined first hydraulic oil temperature To1 and lower than or equal to the predetermined second hydraulic oil temperature To2 (>To1). For example, it is desirable that the hydraulic oil cooled by the first heat exchanger 70 be kept at about 40° C., which makes it possible to cool the motor 40 and the device 61 of the controller 60 to the extent that the motor 40 and the device 61 are prevented from suffering from water condensation due to excessive cooling.

Figure 23:
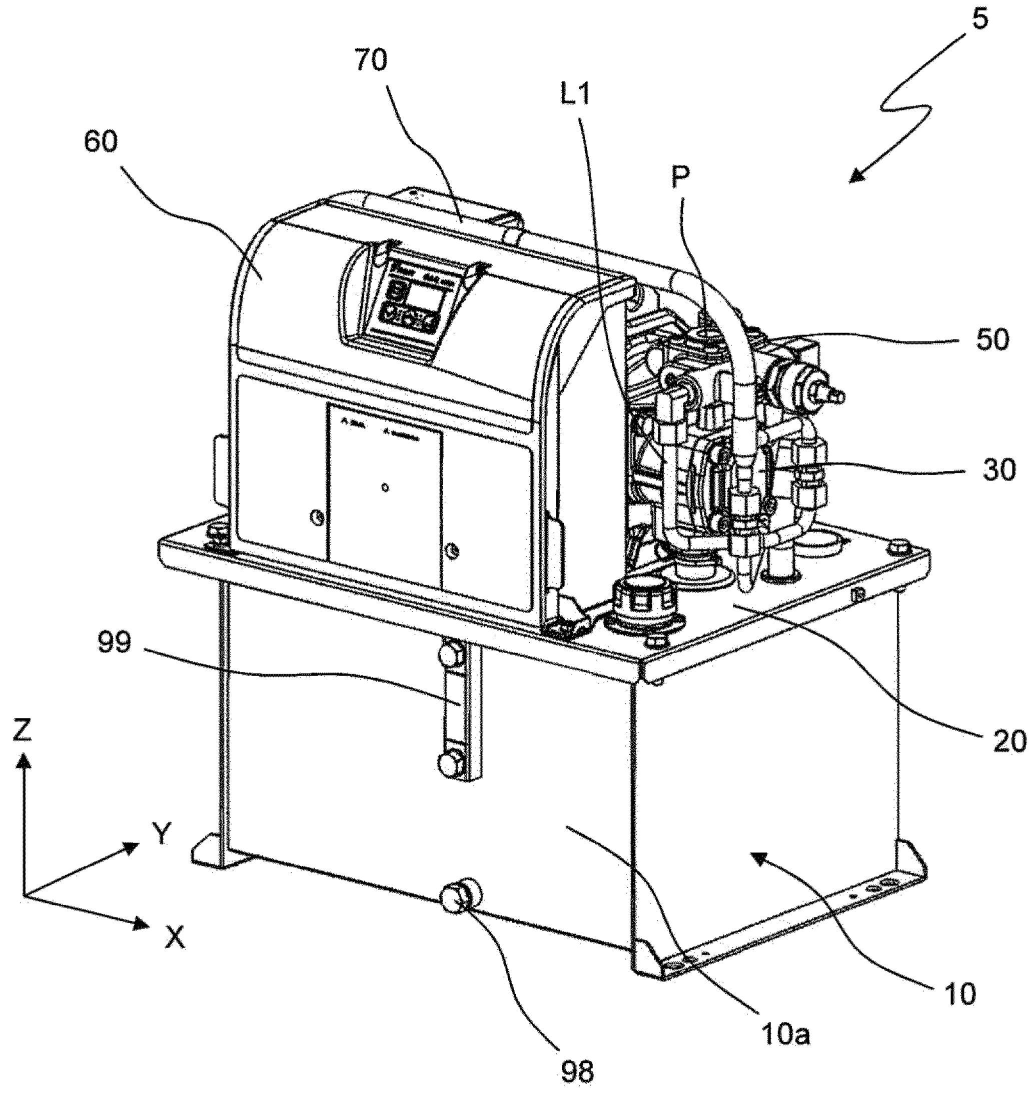
FIG. 23 is a perspective view of a front side of the hydraulic unit according to the fifth embodiment as viewed obliquely from above.
Figure 24:
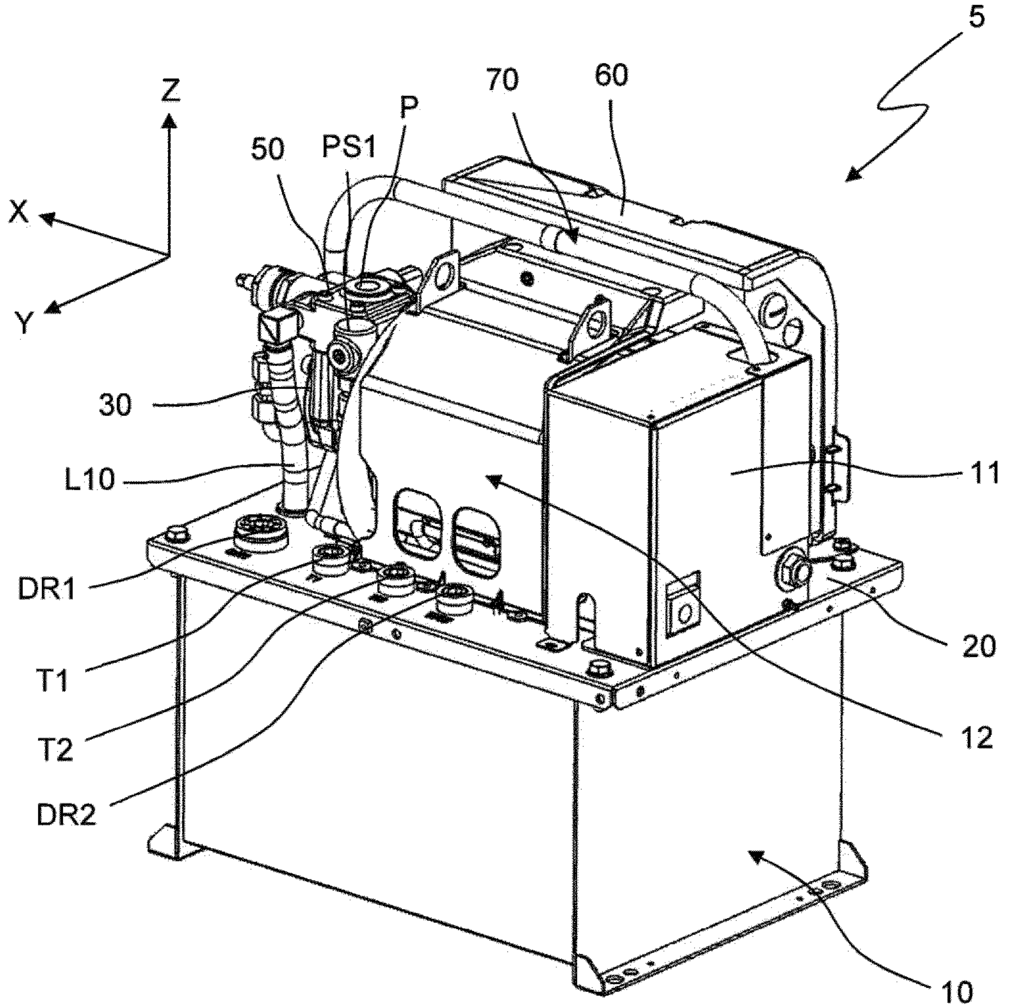
FIG. 24 is a perspective view of a rear side of the hydraulic unit according to the fifth embodiment as viewed obliquely from above.
Figure 25:
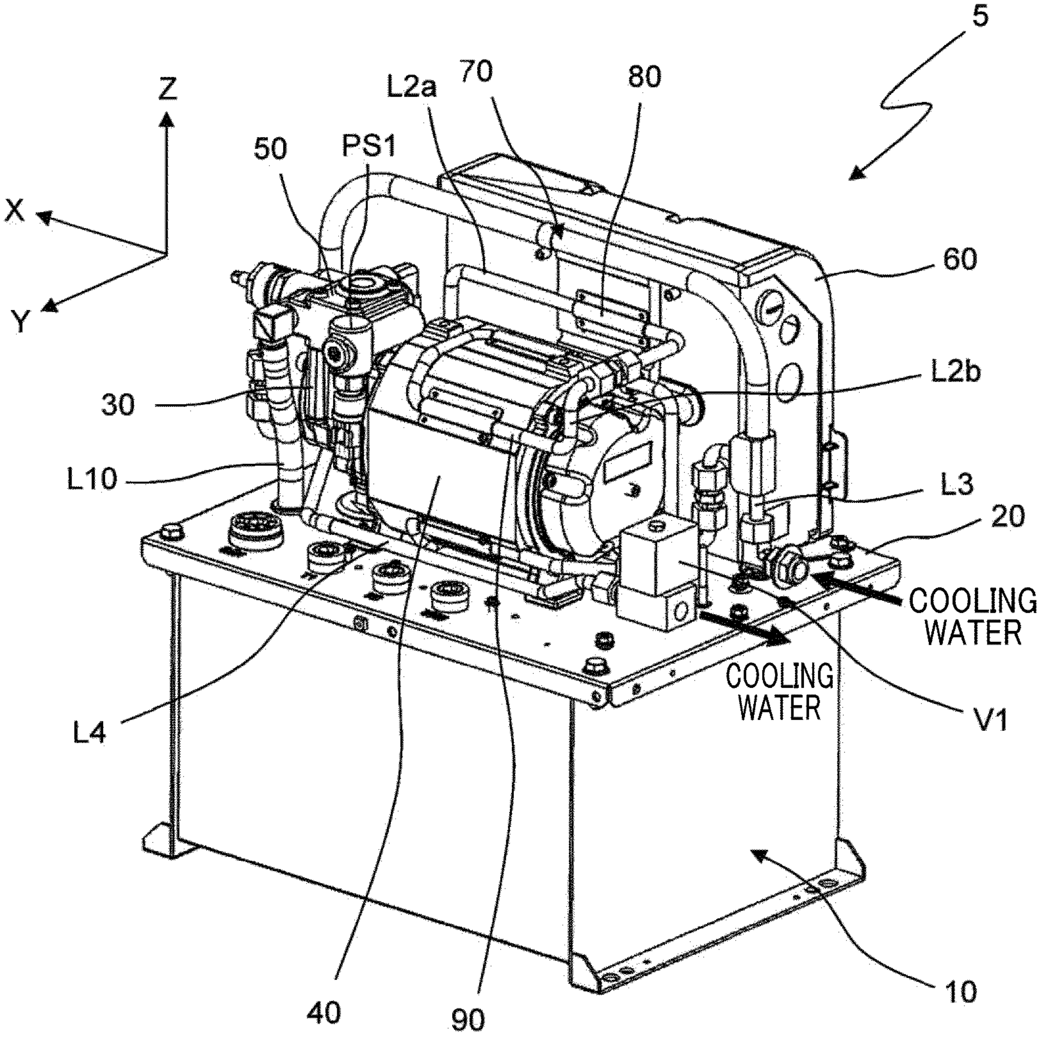
FIG. 25 is a perspective view of the hydraulic unit according to the fifth embodiment with the first and second protection covers removed.
Figure 26:
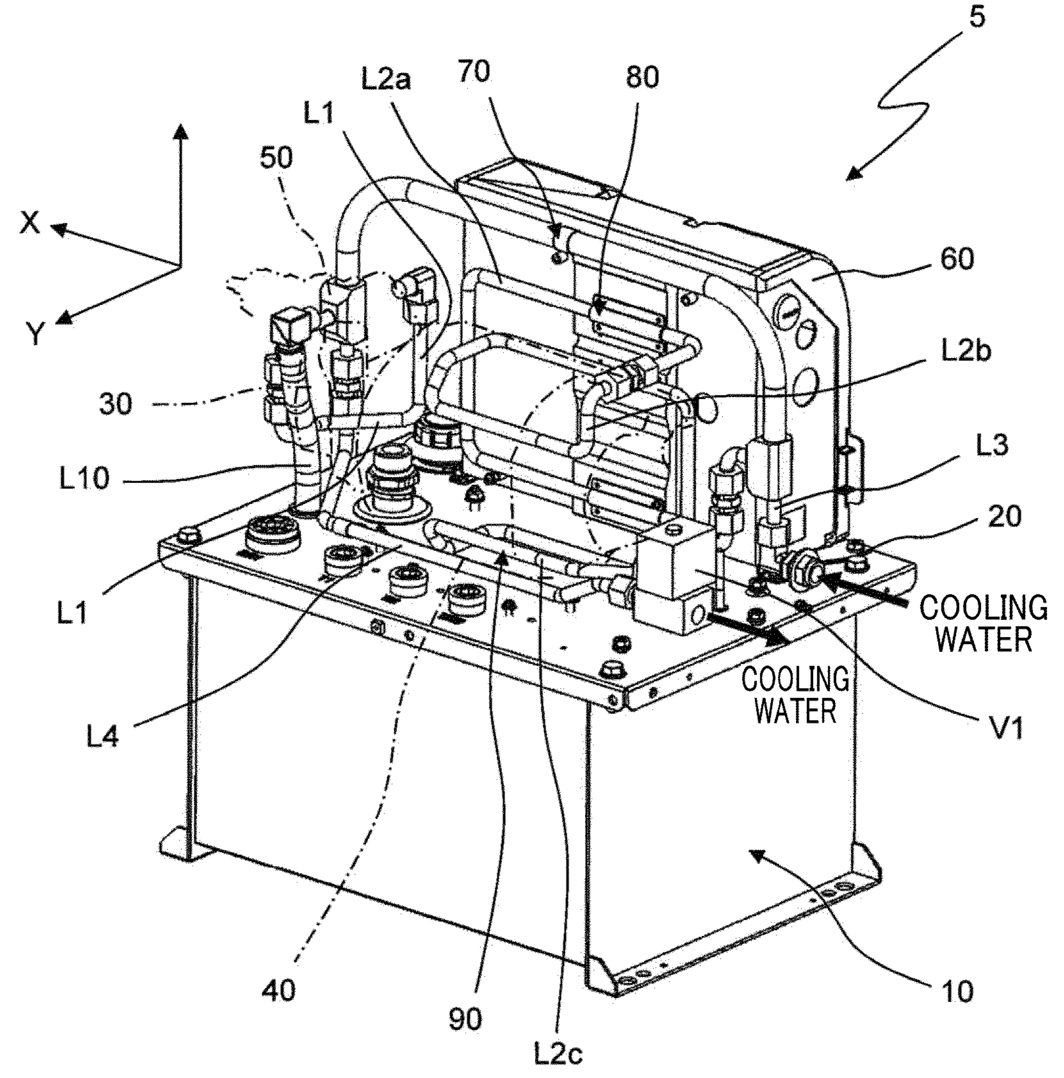
FIG. 26 is a perspective view of the hydraulic unit according to the fifth embodiment with the first and second protection covers, the motor, the hydraulic pump, and the like removed.

FIG. 23 is a perspective view of a front side of the hydraulic unit 5 as viewed obliquely from above, and FIG. 24 is a perspective view of a rear side of the hydraulic unit 5 as viewed obliquely from above. FIG. 25 is a perspective view of the hydraulic unit 5 with the first and second protection covers 11 and 12 removed, and FIG. 26 is a perspective view of the hydraulic unit 5 with the first and second protection covers 11 and 12, the motor 40, the hydraulic pump 30, and the like removed.

Figure 27:
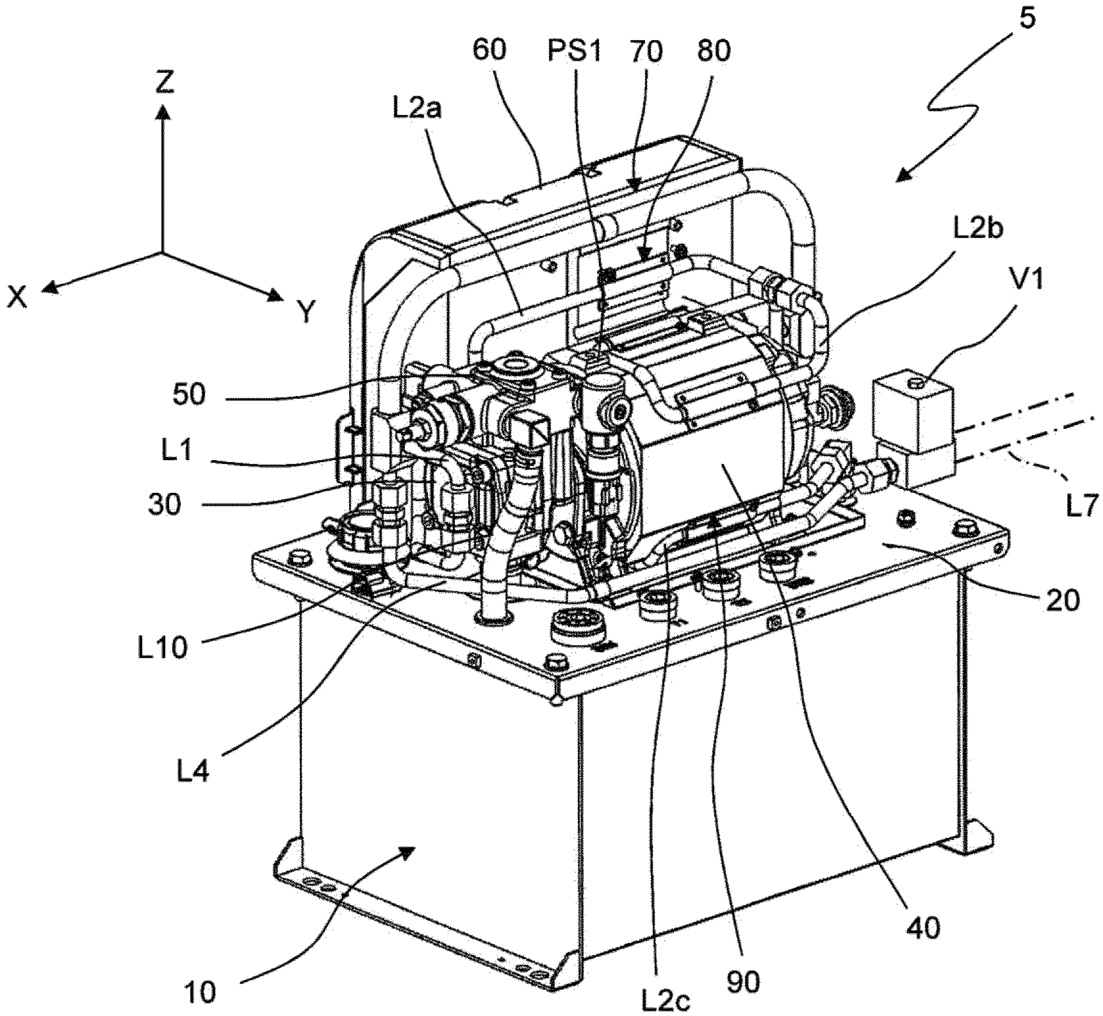
FIG. 27 is a perspective view of the hydraulic unit according to the fifth embodiment with the first and second protection covers removed, as viewed from the rear side and obliquely from above.
Figure 28:
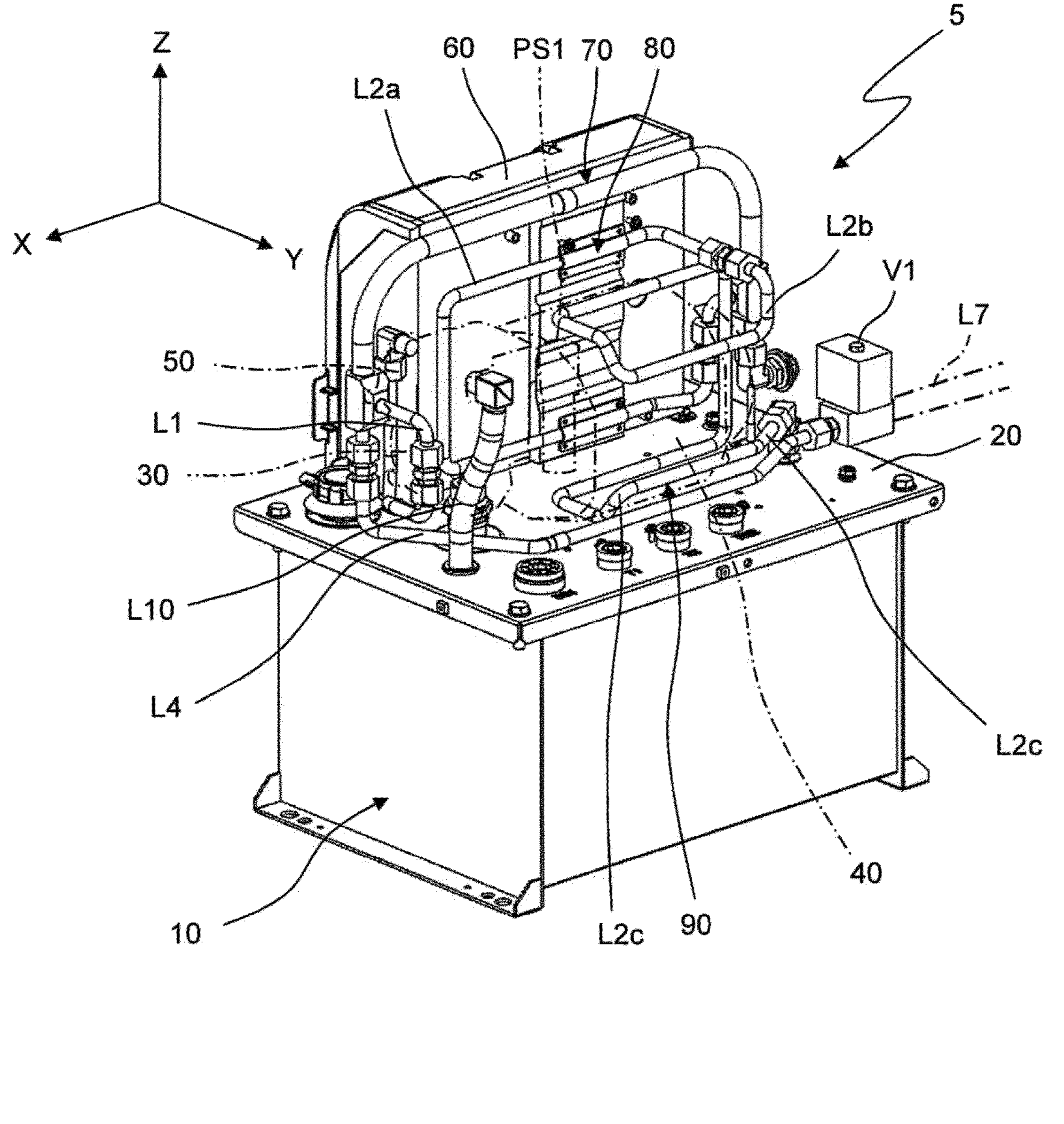
FIG. 28 is a perspective view of the hydraulic unit according to the fifth embodiment with the first and second protection covers, the motor, the hydraulic pump, and the like removed.

FIG. 27 is a perspective view of the hydraulic unit 5 with the first and second protection covers 11 and 12 removed, as viewed from the rear side and obliquely from above, and FIG. 28 is a perspective view of the hydraulic unit 5 with the first and second protection covers 11 and 12, the motor 40, the hydraulic pump 30, and the like removed.

Figure 29:
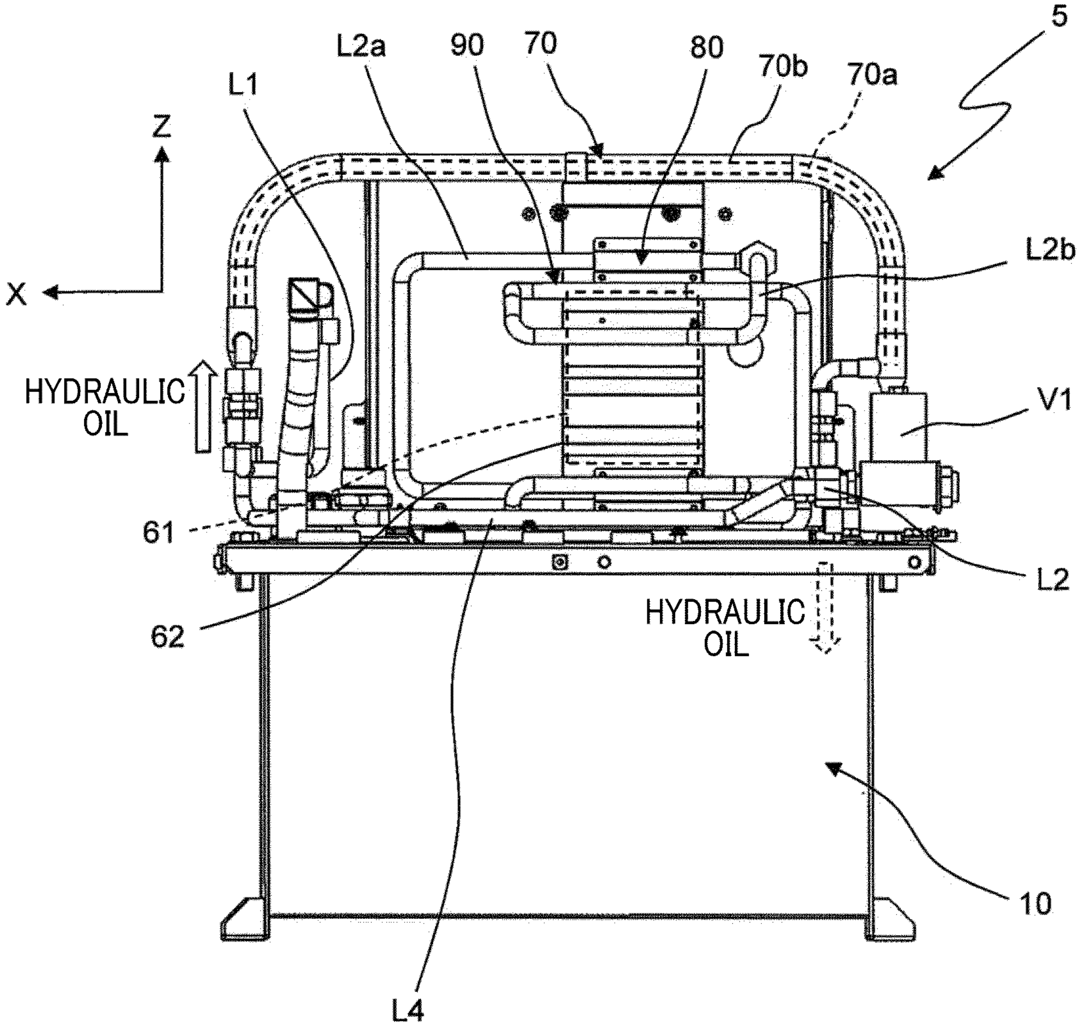
FIG. 29 is a rear view of the hydraulic unit according to the fifth embodiment with the first and second protection covers, the motor, the hydraulic pump, and the like removed.

FIG. 29 is a rear view of the hydraulic unit 5 with the first and second protection covers 11 and 12, the motor 40, the hydraulic pump 30, and the like removed.

First Heat Exchanger 70

As illustrated in FIGS. 25 to 29, the first heat exchanger 70 cools the hydraulic oil by causing the hydraulic oil returning to the oil tank 10 through the pipes L1, L2*a*, L2*b*, and L2*c* and the cooling water to exchange heat with each other. The pipes L1, L2*a*, L2*b*, and L2*c* are examples of the first return pipe.

Second Heat Exchanger 180

The controller 60 includes the device 61 of an inverter circuit (not illustrated) that drives the motor 40 and the heat sink 62 thermally coupled to the device 61. The pipe L2*a* into which the cooled hydraulic oil from the first heat exchanger 70 flows is in thermal contact with the heat sink 62. The pipe L2*a* and the heat sink 62 constitute the second heat exchanger 180.

Third Heat Exchanger 190

The hydraulic oil from the second heat exchanger 180 flows into the pipe L2*b*that is in thermal contact with the housing 40*a* of the motor 40. The pipe L2*b* and the housing 40*a* of the motor 40 constitute the third heat exchanger 190.

Flow of Hydraulic Oil

The hydraulic oil from the hydraulic pump 30 flows into a flow path between the outer peripheral surface of the inner pipe 70*a* (illustrated in FIG. 8A) of the first heat exchanger 70 and the inner peripheral surface of the outer pipe 70*b* (illustrated in FIG. 8A) of the first heat exchanger 70 through the pipe L1, and the hydraulic oil from the flow path returns to the oil tank 10 through the second and third heat exchangers 180 and 190.

Flow of Cooling Water

The cooling water supplied from the external supply source flows into the inner pipe 70*a* of the first heat exchanger 70 through the pipe L3, and the cooling water from the inner pipe 70*a* flows out through the pipe L4. Alternatively, the cooling water may flow between the outer peripheral surface of the inner pipe 70*a* of the first heat exchanger 70 and the inner peripheral surface of the outer pipe 70*b* of the first heat exchanger 70. Next, the cooling water from the first heat exchanger 70 is discharged to the outside through the electromagnetic valve V1 and the drain pipe L7.

The hydraulic unit 5 according to the fifth embodiment has the same effect as the hydraulic unit 1 of the first embodiment has.

The second heat exchanger 180 can cool the device 61 of the controller 60 with the hydraulic oil flowing through the first return pipes (L2*a*, L2*b*, and L2*c*) downstream of the first heat exchanger 70 so as to prevent device 61 from suffering from water condensation due to excessive cooling.

The third heat exchanger 190 can cool the motor 40 with the hydraulic oil flowing through the first return pipes (L2*a*, L2*b*, and L2*c*) downstream of the first heat exchanger 70 so as to prevent the motor 40 from suffering from water condensation due to excessive cooling.

In the fifth embodiment, the hydraulic oil from the drain ports DR1 and DR2 is guided to the first heat exchanger 70 for cooling, or alternatively, the hydraulic oil from the drain ports DR1 and DR2 may be directly returned to the oil tank 10 through the pipes L43 and L44.

Sixth Embodiment

Figure 30:
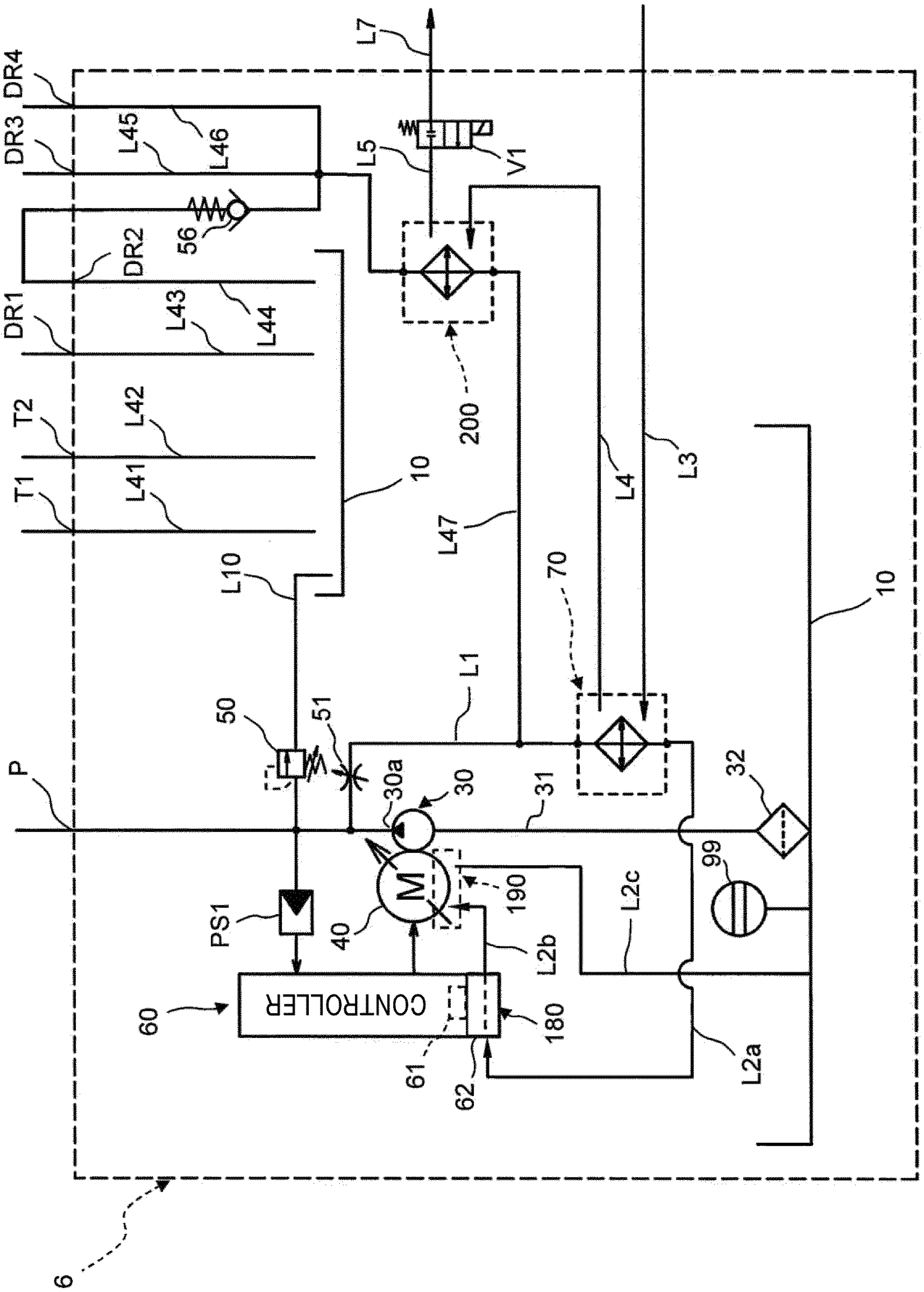
FIG. 30 is a circuit diagram of a hydraulic unit according to a sixth embodiment of the present disclosure.

FIG. 30 is a circuit diagram of a hydraulic unit 6 according to a sixth embodiment of the present disclosure. The hydraulic unit 6 according to the sixth embodiment is identical in configuration to the hydraulic unit 5 according to the fifth embodiment except for the connection structure of drain ports DR2, DR3, and DR4 and that a fourth heat exchanger 200 is further provided.

As illustrated in FIG. 30, the hydraulic unit 6 according to the sixth embodiment causes the second heat exchanger 180 to cool the device 61 of the controller 60 and causes the third heat exchanger 190 to cool the motor 40 with the hydraulic oil cooled by the first heat exchanger 70. The fourth heat exchanger 200 cools the hydraulic oil flowing into the drain ports DR3 and DR4. The fourth heat exchanger 200 is identical in configuration to the first heat exchanger 70. Here, the hydraulic oil discharged from the actuator (for example, a hydraulic cylinder) or the like belonging to the main machine flows into the drain ports DR3 and DR4.

The drain port DR3 is connected to one end of a pipe L45, the hydraulic oil inlet of the fourth heat exchanger 200 is connected to the other end of the pipe L45, the drain port DR4 is connected to one end of a pipe L46, and the pipe L45 is connected to the other end of the pipe L46. The hydraulic oil outlet of the fourth heat exchanger 200 is connected to one end of a pipe L47, and the pipe L1 is connected to the other end of the pipe L47.

The pipe L45 and the drain port DR2 are connected through a check valve 56. The check valve 56 restricts the flow of the hydraulic oil from the drain port DR2 toward the pipe L45, and opens when the pressure applied to the pipe L45 becomes higher than or equal to a predetermined pressure to allow the hydraulic oil to flow from the pipe L45 toward the drain port DR2.

The hydraulic unit 6 includes a temperature sensor (not illustrated) that detects the temperature of the hydraulic oil in the oil tank 10. The controller 60 can optimize the flow rate of the coolant flowing through the first heat exchanger 70 by controlling to open and close the electromagnetic valve V1 in accordance with the temperature of the hydraulic oil detected by the temperature sensor.

Specifically, the controller 60 can keep the hydraulic oil at an appropriate temperature by controlling the electromagnetic valve V1 to regulate the flow rate of the coolant flowing through the first heat exchanger 70, so as to make the temperature To of the hydraulic oil higher than or equal to the predetermined first hydraulic oil temperature To1 and lower than or equal to the predetermined second hydraulic oil temperature To2 (>To1). For example, it is desirable that the hydraulic oil cooled by the first heat exchanger 70 be kept at about 40° C., which makes it possible to cool the motor 40 and the device 61 of the controller 60 to the extent that the motor 40 and the device 61 are prevented from suffering from water condensation due to excessive cooling.

Figure 31:
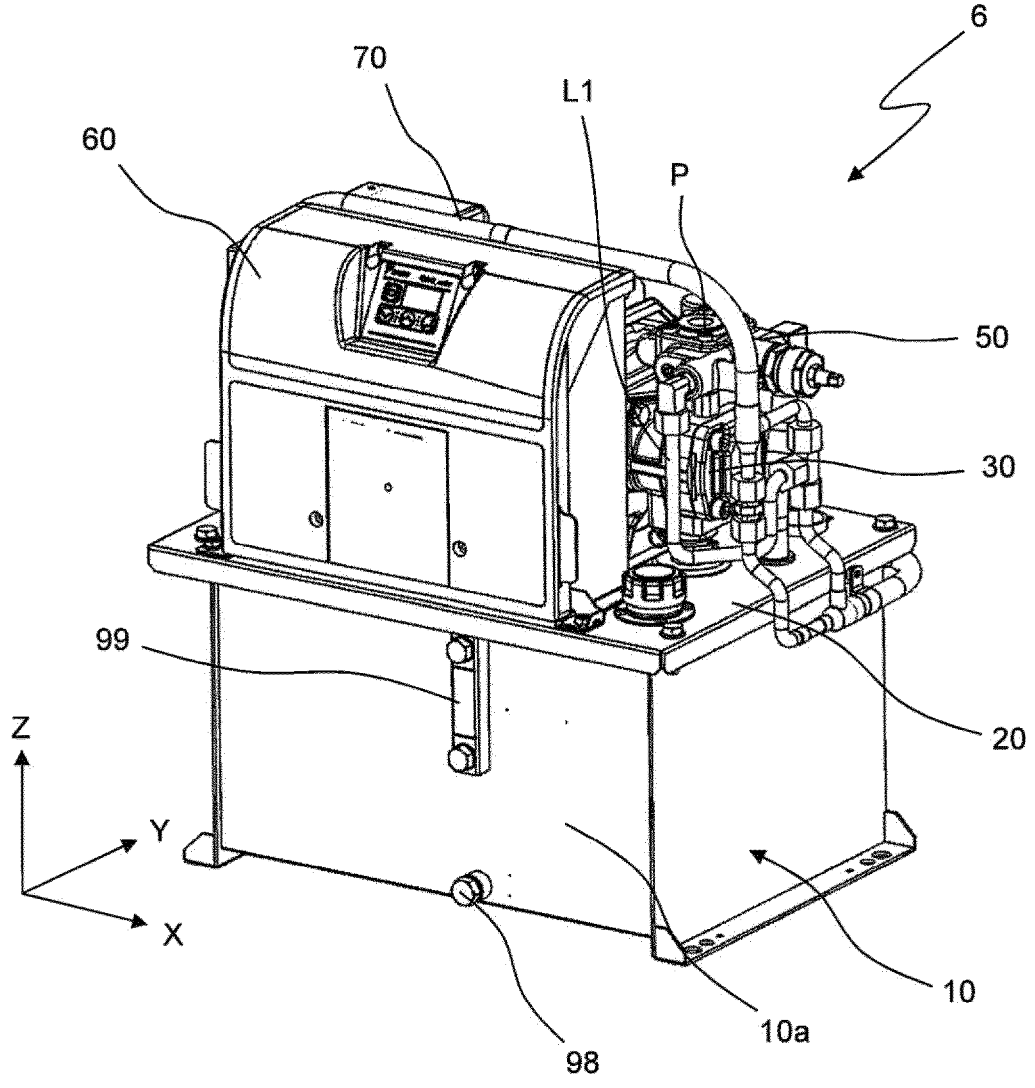
FIG. 31 is a perspective view of a front side of the hydraulic unit according to the sixth embodiment as viewed obliquely from above.
Figure 32:
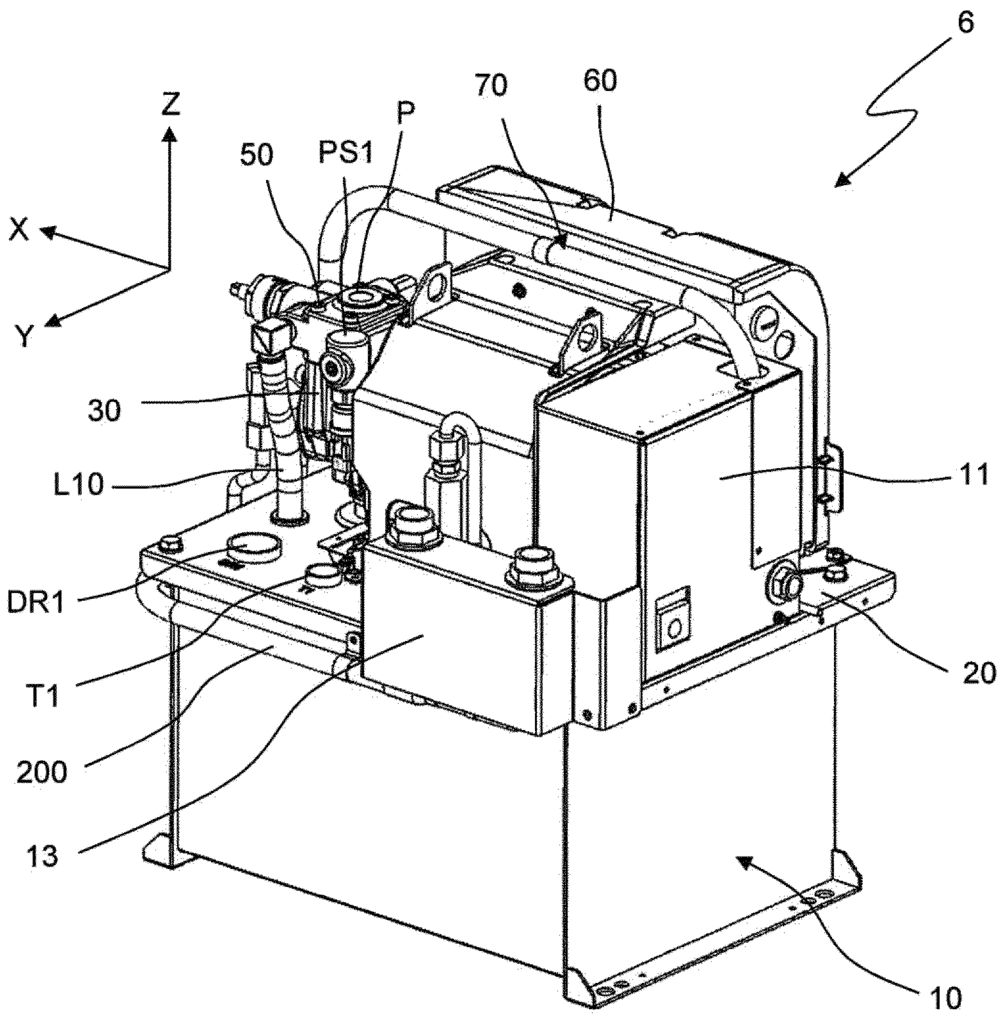
FIG. 32 is a perspective view of a rear side of the hydraulic unit according to the sixth embodiment as viewed obliquely from above.
Figure 33:
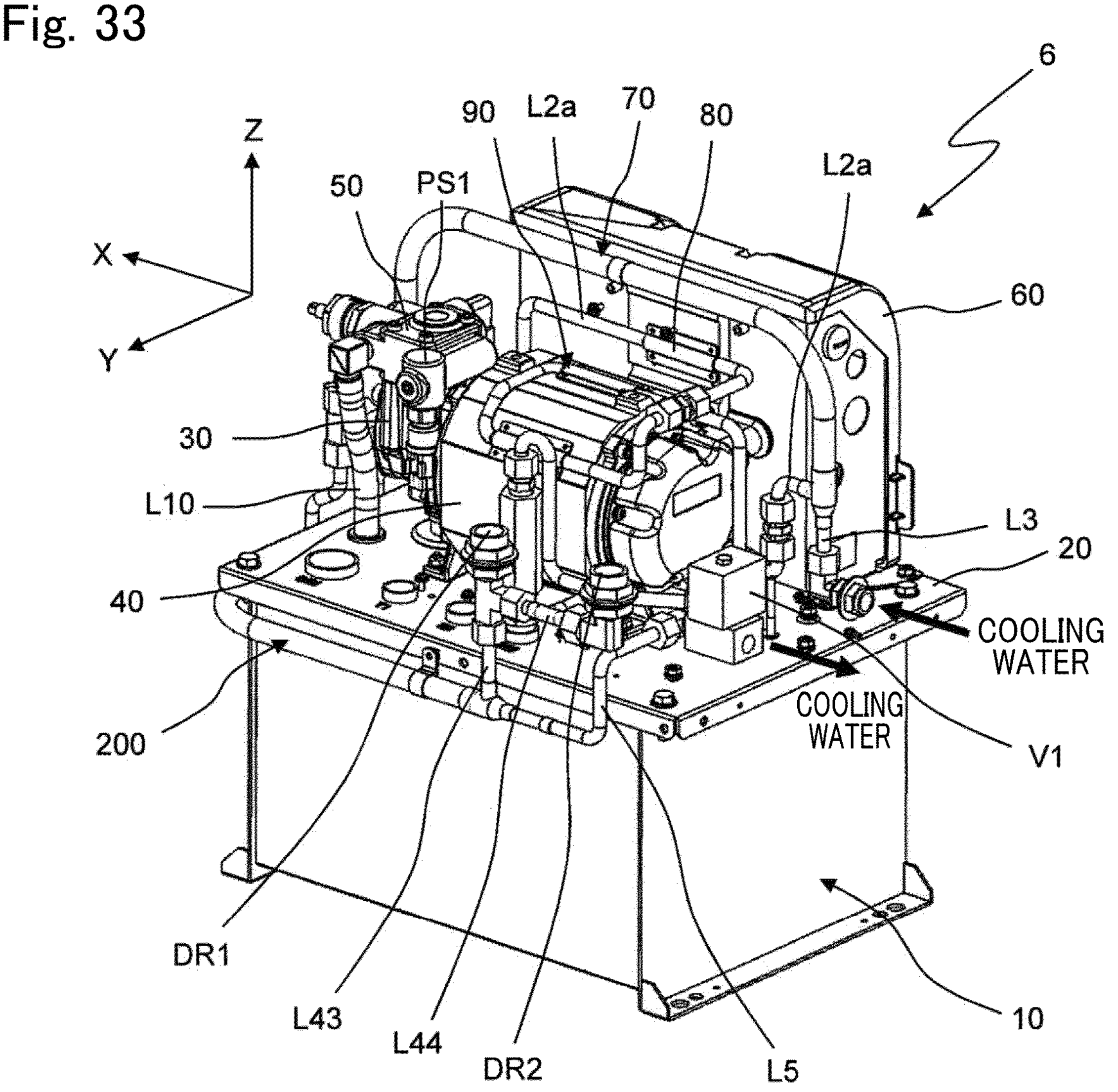
FIG. 33 is a perspective view of the hydraulic unit according to the sixth embodiment with the first and second protection covers removed.
Figure 34:
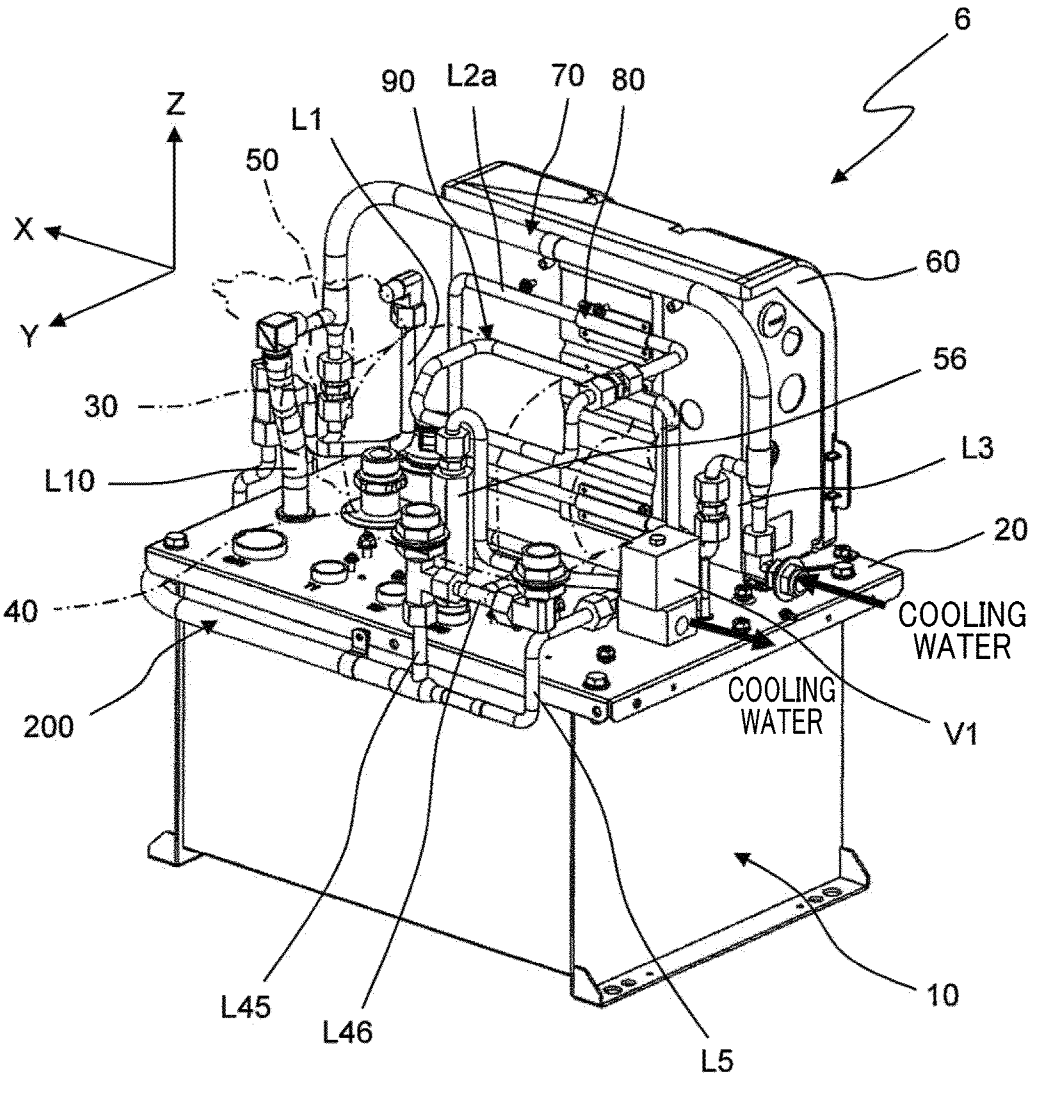
FIG. 34 is a perspective view of the hydraulic unit according to the sixth embodiment with the first and second protection covers, the motor, the hydraulic pump, and the like removed.

FIG. 31 is a perspective view of a front side of the hydraulic unit 6 as viewed obliquely from above, and FIG. 32 is a perspective view of a rear side of the hydraulic unit 6 as viewed obliquely from above. FIG. 33 is a perspective view of the hydraulic unit 6 with the first and second protection covers 11 and 12 removed, and FIG. 34 is a perspective view of the hydraulic unit 6 with the first and second protection covers 11 and 12, the motor 40, the hydraulic pump 30, and the like removed.

Figure 35:
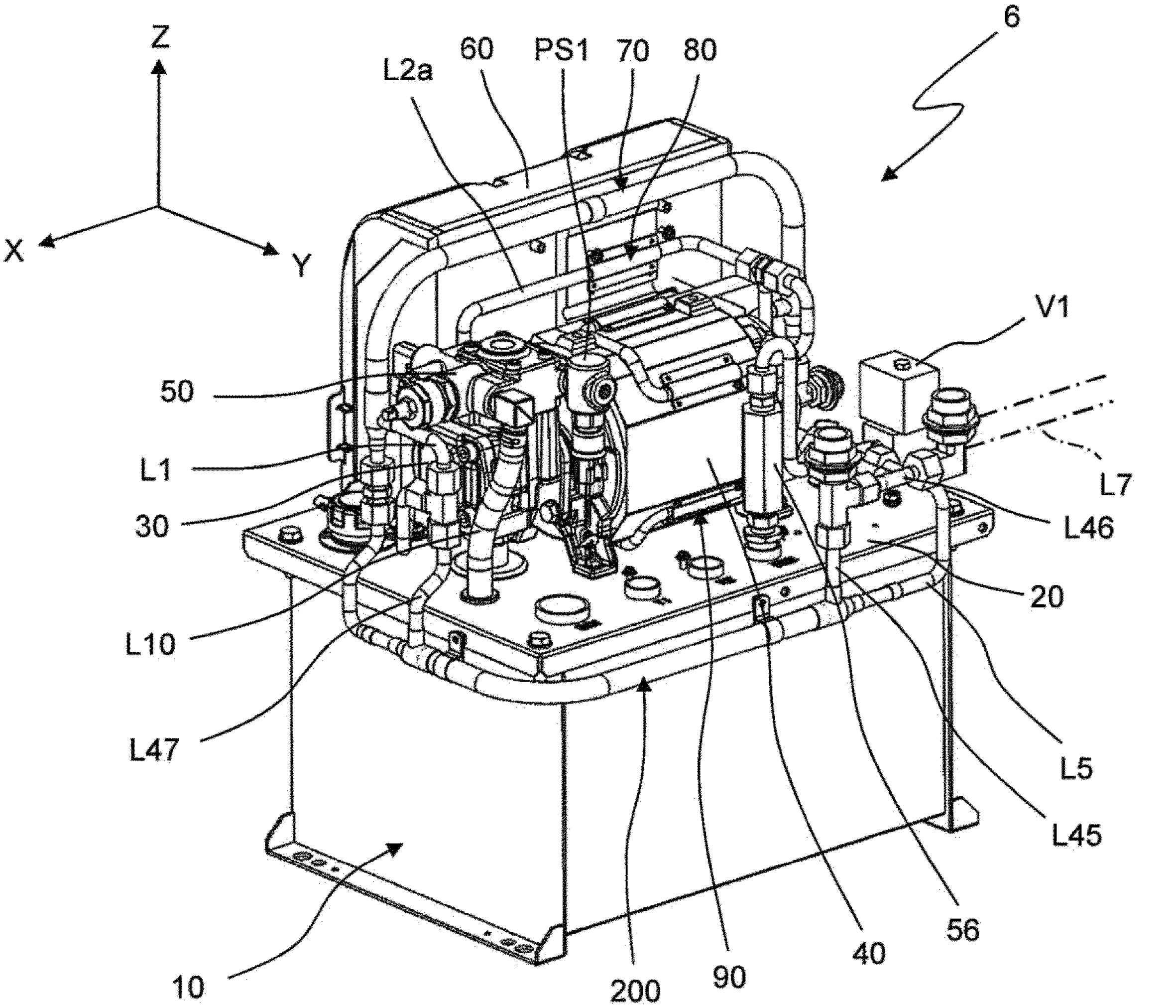
FIG. 35 is a perspective view of the hydraulic unit according to the sixth embodiment with the first and second protection covers removed, as viewed from the rear side and obliquely from above.
Figure 36:
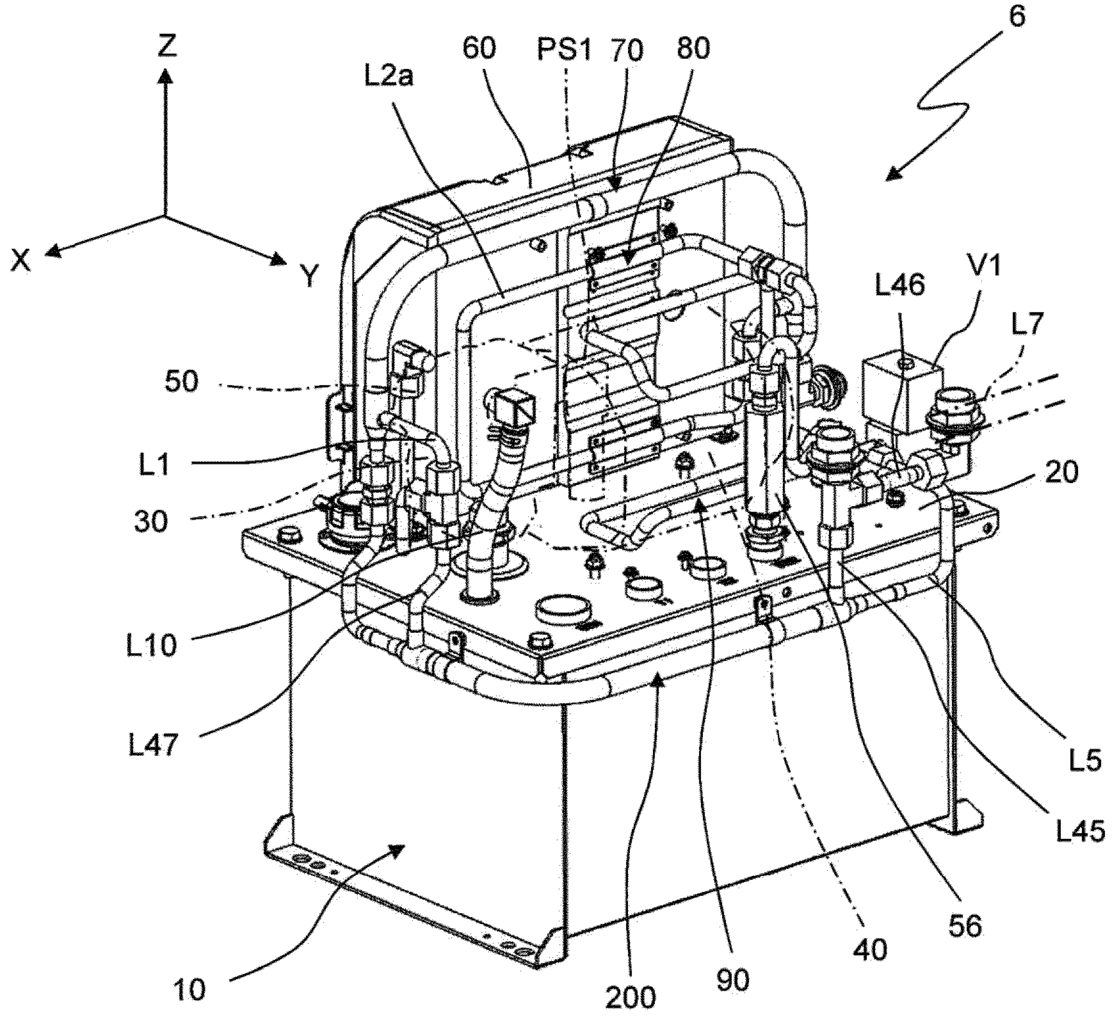
FIG. 36 is a perspective view of the hydraulic unit according to the sixth embodiment with the first and second protection covers, the motor, the hydraulic pump, and the like removed.

FIG. 35 is a perspective view of the hydraulic unit 6 with the first and second protection covers 11 and 12 removed, as viewed from the rear side and obliquely from above, and FIG. 36 is a perspective view of the hydraulic unit 6 with the first and second protection covers 11 and 12, the motor 40, the hydraulic pump 30, and the like removed.

Figure 37:
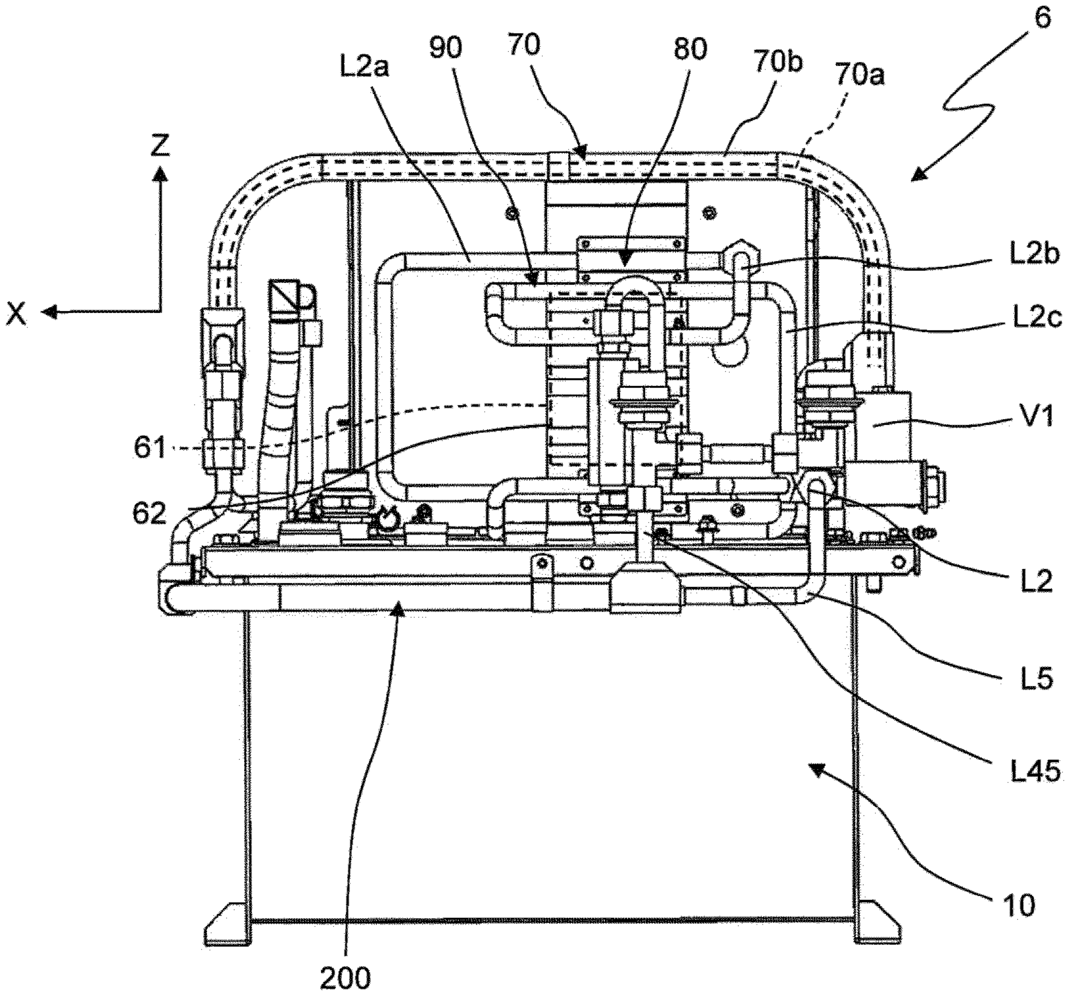
FIG. 37 is a rear view of the hydraulic unit according to the sixth embodiment with the first and second protection covers, the motor, the hydraulic pump, and the like removed.

FIG. 37 is a rear view of the hydraulic unit 6 with the first and second protection covers 11 and 12, the motor 40, the hydraulic pump 30, and the like removed.

First Heat Exchanger 70

As illustrated in FIGS. 32 to 37, the first heat exchanger 70 cools the hydraulic oil by causing the hydraulic oil returning to the oil tank 10 through the pipes L1, L2*a*, L2*b*, and L2*c* and the cooling water to exchange heat with each other. The pipes L1, L2*a*, L2*b*, and L2*c* are examples of the first return pipe.

Second Heat Exchanger 180

The controller 60 includes the device 61 of an inverter circuit (not illustrated) that drives the motor 40 and the heat sink 62 thermally coupled to the device 61. The pipe L2*a* into which the cooled hydraulic oil from the first heat exchanger 70 flows is in thermal contact with the heat sink 62. The pipe L2*a* and the heat sink 62 constitute the second heat exchanger 180.

Third Heat Exchanger 190

The hydraulic oil from the second heat exchanger 180 flows into the pipe L2*b* that is in thermal contact with the housing 40*a* of the motor 40. The pipe L2*b* and the housing 40*a* of the motor 40 constitute the third heat exchanger 190.

Fourth Heat Exchanger 200

The fourth heat exchanger 200 cools the hydraulic oil by causing the hydraulic oil returning to the oil tank 10 through the pipes L45, L46, and L47 and the cooling water to exchange heat with each other. The pipes L45, L46, and L47 are examples of the second return pipe.

Flow of Hydraulic Oil

The hydraulic oil from the hydraulic pump 30 flows into a flow path between the outer peripheral surface of the inner pipe 70*a* (illustrated in FIG. 8A) and the inner peripheral surface of the outer pipe 70*b* (illustrated in FIG. 8A) of the first heat exchanger 70 through the pipe L1, and the hydraulic oil from the flow path returns to the oil tank 10 through the second and third heat exchangers 180 and 190. The hydraulic oil from the drain ports DR3 and DR4 returns to the oil tank 10 through the fourth heat exchanger 200 and the first heat exchanger 70.

Flow of Cooling Water

The cooling water supplied from the external supply source flows into the inner pipe 70*a* of the first heat exchanger 70 through the pipe L3, and the cooling water from the inner pipe 70*a* flows into the fourth heat exchanger 200 through the pipe L4. Then, the cooling water from the fourth heat exchanger 200 is discharged to the outside through the pipe L5, the electromagnetic valve V1, and the drain pipe L7.

The above-described hydraulic unit 6 according to the sixth embodiment has the same effect as the hydraulic unit 5 of the fifth embodiment has.

In the sixth embodiment, the hydraulic oil from the drain ports DR3 and DR4 is returned to the oil tank 10 through the fourth heat exchanger 200 and the first heat exchanger 70, or alternatively, the hydraulic oil from the drain ports DR3 and DR4 may be directly returned to the oil tank 10 through the fourth heat exchanger 200. This case also allows an increase in the performance of cooling the hydraulic oil.

In the sixth embodiment, the hydraulic oil cooled by the first heat exchanger 70 is returned to the oil tank 10 through the second and third heat exchangers 180 and 190, or alternatively, the hydraulic oil cooled by the first heat exchanger 70 may be directly returned to the oil tank 10 without passing through the second and third heat exchangers 180 and 190, and cooling air may be supplied from the fan to both the motor 40 and the heat sink 62 of the controller 60 (control unit) as in the fourth embodiment.

Seventh Embodiment

Figure 38:
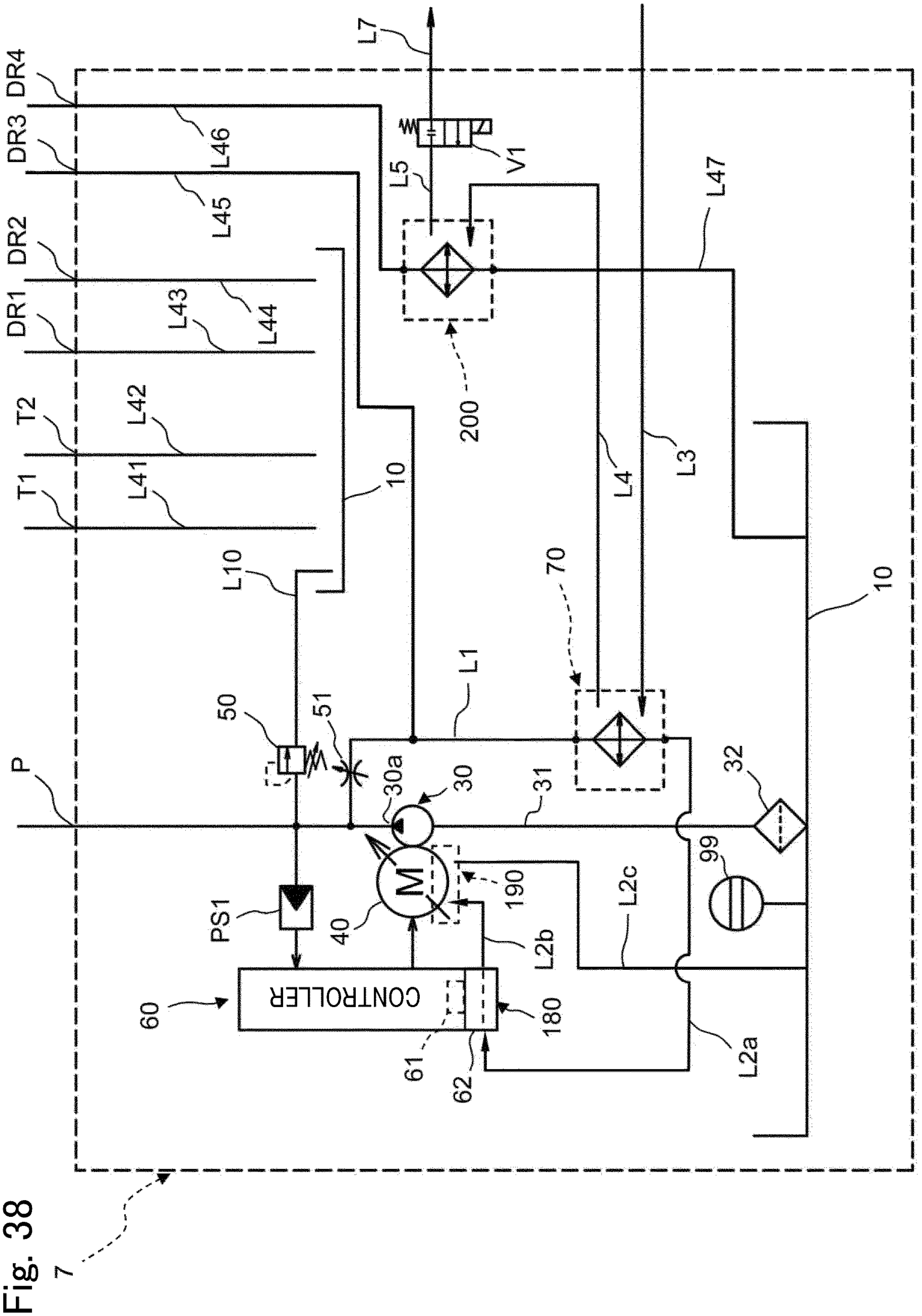
FIG. 38 is a circuit diagram of a hydraulic unit according to a seventh embodiment of the present disclosure.

FIG. 38 is a circuit diagram of a hydraulic unit 7 according to a seventh embodiment of the present disclosure. The hydraulic unit 7 according to the seventh embodiment is identical in configuration to the hydraulic unit 6 according to the sixth embodiment except for the connection structure of the drain ports DR2, DR3, and DR4 and the connection structure of the fourth heat exchanger 200.

As illustrated in FIG. 38, the hydraulic unit 7 according to the seventh embodiment causes the second heat exchanger 180 to cool the device 61 of the controller 60 and causes the third heat exchanger 190 to cool the motor 40 with the hydraulic oil cooled by the first heat exchanger 70. The fourth heat exchanger 200 cools the hydraulic oil flowing into the drain port DR4. The fourth heat exchanger 200 is identical in configuration to the first heat exchanger 70. The drain port DR3 is connected to the pipe L1 through the pipe L45. The hydraulic oil from the drain port DR3 is guided to the first heat exchanger 70 for cooling. Here, the hydraulic oil discharged from the actuator (for example, a hydraulic cylinder) or the like belonging to the main machine flows into the drain ports DR3 and DR4.

The pipe L46 has one end connected to the drain port DR4 and has the other end connected to the hydraulic oil inlet of the fourth heat exchanger 200. The hydraulic oil is guided from the hydraulic oil outlet of the fourth heat exchanger 200 into the oil tank 10 through the pipe L47.

The hydraulic unit 7 includes a temperature sensor (not illustrated) that detects the temperature of the hydraulic oil in the oil tank 10. The controller 60 can optimize the flow rate of the coolant flowing through the first heat exchanger 70 by controlling to open and close the electromagnetic valve V1 in accordance with the temperature of the hydraulic oil detected by the temperature sensor.

Specifically, the controller 60 can keep the hydraulic oil at an appropriate temperature by controlling the electromagnetic valve V1 to regulate the flow rate of the coolant flowing through the first heat exchanger 70, so as to make the temperature To of the hydraulic oil higher than or equal to the predetermined first hydraulic oil temperature To1 and lower than or equal to the predetermined second hydraulic oil temperature To2 (>To1). For example, it is desirable that the hydraulic oil cooled by the first heat exchanger 70 be kept at about 40° C., which makes it possible to cool the motor 40 and the device 61 of the controller 60 to the extent that the motor 40 and the device 61 are prevented from suffering from water condensation due to excessive cooling.

Flow of Hydraulic Oil

The hydraulic oil from the hydraulic pump 30 flows into a flow path between the outer peripheral surface of the inner pipe 70*a* (illustrated in FIG. 8A) and the inner peripheral surface of the outer pipe 70*b* (illustrated in FIG. 8A) of the first heat exchanger 70 through the pipe L1, and the hydraulic oil from the flow path returns to the oil tank 10 through the second and third heat exchangers 180 and 190. The hydraulic oil from the drain port DR4 returns to the oil tank 10 through the fourth heat exchanger 200. The hydraulic unit 7 according to the seventh embodiment can make the flow rate of the hydraulic oil in the first heat exchanger 70 lower to reduce pressure loss as compared with the sixth embodiment.

Flow of Cooling Water

The cooling water supplied from the external supply source flows into the inner pipe 70*a* of the first heat exchanger 70 through the pipe L3, and the cooling water from the inner pipe 70*a* flows into the fourth heat exchanger 200 through the pipe L4. Then, the cooling water from the fourth heat exchanger 200 is discharged to the outside through the pipe L5, the electromagnetic valve V1, and the drain pipe L7.

The above-described hydraulic unit 7 according to the seventh embodiment has the same effect as the hydraulic unit 6 of the sixth embodiment has.

Although specific embodiments of the present disclosure have been described, the present disclosure is not limited to the first to seventh embodiments, and various modifications can be made within the scope of the present disclosure. For example, an appropriate combination of the contents described in the first to seventh embodiments may be regarded as an embodiment of the present disclosure.

A hydraulic unit according to a first aspect of the present disclosure includes:

- an oil tank that stores a hydraulic oil;
- a hydraulic pump that supplies the hydraulic oil in the oil tank to an actuator;
- a first return pipe through which the hydraulic oil is returned from a flow path between a discharge port of the hydraulic pump and the actuator to the oil tank; and
- a first heat exchanger that causes the hydraulic oil returning to the oil tank through the first return pipe and a coolant to exchange heat with each other.

According to the present disclosure, when the hydraulic oil is returned from the flow path between the discharge port of the hydraulic pump and the actuator to the oil tank through the first return pipe, the first heat exchanger causes the hydraulic oil returning to the oil tank through the first return pipe and the coolant to exchange heat with each other, so that it is possible to increase performance of cooling the hydraulic oil even under an environment where an ambient temperature is high.

A hydraulic unit according to a second aspect of the present disclosure is based on the hydraulic unit according to the first aspect and further includes a relief valve connected to the discharge port of the hydraulic pump, in which the first return pipe includes a pipe through which the hydraulic oil is returned to the oil tank through the relief valve.

According to the present disclosure, when the hydraulic oil is returned from the flow path between the discharge port of the hydraulic pump and the actuator to the oil tank through the relief valve, the first heat exchanger causes the hydraulic oil returning to the oil tank through the first return pipe and the coolant to exchange heat with each other, so that it is possible to further increase the performance of cooling the hydraulic oil.

A hydraulic unit according to a third aspect of the present disclosure is based on the hydraulic unit according to the first aspect or the second aspect and further includes a second return pipe through which the hydraulic oil discharged from the actuator is returned to the oil tank, in which the first heat exchanger causes the hydraulic oil returning to the oil tank through the first return pipe and the coolant to exchange heat with each other, and causes the hydraulic oil returning to the oil tank through the second return pipe and the coolant to exchange heat with each other.

According to the present disclosure, the first heat exchanger cools not only the hydraulic oil returning from the flow path between the discharge port of the hydraulic pump and the actuator to the oil tank through the relief valve but also the hydraulic oil discharged from the actuator, so that it is possible to further increase the performance of cooling the hydraulic oil.

A hydraulic unit according to a fourth aspect of the present disclosure is based on the hydraulic unit according to any one of the first aspect to the third aspect, in which the first heat exchanger includes a double pipe having an inner pipe with a multi-lobed cross section and an outer pipe accommodating the inner pipe.

According to the present disclosure, the use of the first heat exchanger of double-pipe structure having the inner pipe with a multi-lobed cross section and the outer pipe accommodating the inner pipe allows an increase in the performance of cooling the hydraulic oil in the first heat exchanger that can be downsized.

A hydraulic unit according to a fifth aspect of the present disclosure is based on the hydraulic unit according to any one of the first aspect to the fourth aspect and further includes:

- a motor that drives the hydraulic pump;
- a control unit including a device that drives the motor; and
- a second heat exchanger that causes the device of the control unit and the coolant to exchange heat with each other.

According to the present disclosure, the second heat exchanger causes the device that drives the motor and the coolant to exchange heat with each other, so that it is possible to increase performance of cooling the device as compared with air cooling.

A hydraulic unit according to a sixth aspect of the present disclosure is based on the hydraulic unit according to any one of the first aspect to the fourth aspect and further includes:

- a motor that drives the hydraulic pump; and
- a third heat exchanger that causes the motor and the coolant to exchange heat with each other.

According to the present disclosure, the third heat exchanger causes the motor that drives the hydraulic pump and the coolant to exchange heat with each other, so that it is possible to increase performance of cooling the motor as compared with air cooling.

A hydraulic unit according to a seventh aspect of the present disclosure is based on the hydraulic unit according to any one of the first aspect to the fourth aspect and further includes:

- a motor that drives the hydraulic pump;
- a control unit including a device that drives the motor;
- a second heat exchanger that causes the device of the control unit and the coolant to exchange heat with each other;
- a third heat exchanger that causes the motor and the coolant to exchange heat with each other, the first heat exchanger, the second heat exchanger, and the third heat exchanger being connected in series; and
- a flow rate control valve that controls a flow rate of the coolant supplied to the first heat exchanger, the second heat exchanger, and the third heat exchanger.

According to the present disclosure, the first heat exchanger can cool the hydraulic oil, and the second and third heat exchangers can cool the device and the motor. It is further possible to simplify, by connecting the first heat exchanger, the second heat exchanger, and the third heat exchanger in series, a piping configuration for the coolant. It is further possible to cause the flow rate control valve to simultaneously regulate the flow rate of the coolant supplied to the first heat exchanger, the second heat exchanger, and the third heat exchanger. For example, it is possible to optimize the flow rate of the coolant flowing through the first heat exchanger, the second heat exchanger, and the third heat exchanger in accordance with the temperature of the hydraulic oil, the temperature of the device, and the temperature of the motor.

A hydraulic unit according to an eighth aspect of the present disclosure is based on the hydraulic unit according to the seventh aspect, in which the control unit controls an opening degree of the flow rate control valve so as to make a temperature Td of the device of the control unit higher than or equal to a predetermined first device temperature Td1 and lower than or equal to a predetermined second device temperature Td2 (>Td1).

According to the present disclosure, the control unit can keep the device at an appropriate temperature by controlling the opening degree of the flow rate control valve to regulate the flow rate of the coolant flowing through the second heat exchanger, so as to make the temperature Td of the device higher than or equal to the predetermined first device temperature Td1 and lower than or equal to the predetermined second device temperature Td2 (>Td1).

A hydraulic unit according to a ninth aspect of the present disclosure is based on any one of the first aspect to the fourth aspect and further includes:

- a motor that drives the hydraulic pump;
- a control unit including a device that drives the motor;
- a second heat exchanger that causes the device of the control unit and the coolant to exchange heat with each other;
- a third heat exchanger that causes the motor and the coolant to exchange heat with each other;
- a first flow rate control valve that controls a flow rate of the coolant supplied to the first heat exchanger;
- a second flow rate control valve that controls a flow rate of the coolant supplied to the second heat exchanger; and
- a third flow rate control valve that controls a flow rate of the coolant supplied to the third heat exchanger.

According to the present disclosure, the first heat exchanger can increase the performance of cooling the hydraulic oil, and the second and third heat exchangers can increase the performance of cooling the device and the motor. Furthermore, the first flow rate control valve can regulate the flow rate of the coolant supplied to the first heat exchanger, the second flow rate control valve can regulate the flow rate of the coolant supplied to the second heat exchanger, and the third flow rate control valve can regulate the flow rate of the coolant supplied to the third heat exchanger. For example, it is possible to optimize the flow rate of the coolant flowing through each of the first heat exchanger, the second heat exchanger, and the third heat exchanger in accordance with the temperature of the hydraulic oil, the temperature of the device, and the temperature of the motor.

A hydraulic unit according to a tenth aspect of the present disclosure is based on the hydraulic unit according to the ninth aspect, in which the control unit controls an opening degree of the first flow rate control valve so as to make a temperature To of the hydraulic oil in the oil tank higher than or equal to a predetermined first hydraulic oil temperature To1 and lower than or equal to a predetermined second hydraulic oil temperature To2 (>To1), controls an opening degree of the second flow rate control valve so as to make a temperature Td of the device of the control unit higher than or equal to a predetermined first device temperature Td1 and lower than or equal to a predetermined second device temperature Td2 (>Td1), and controls an opening degree of the third flow rate control valve so as to make a temperature Tm of the motor higher than or equal to a predetermined first motor temperature Tm1 and lower than or equal to a predetermined second motor temperature Tm2 (>Tm1).

According to the present disclosure, the control unit can keep the hydraulic oil at an appropriate temperature by controlling the opening degree of the first flow rate control valve to regulate the flow rate of the coolant flowing through the first heat exchanger, so as to make the temperature To of the hydraulic oil higher than or equal to the predetermined first hydraulic oil temperature To1 and lower than or equal to the predetermined second hydraulic oil temperature To2 (>To1). The control unit can keep the device at an appropriate temperature by controlling the opening degree of the second flow rate control valve to regulate the flow rate of the coolant flowing through the second heat exchanger, so as to make the temperature Td of the device higher than or equal to the predetermined first device temperature Td1 and lower than or equal to the predetermined second device temperature Td2 (>Td1). The control unit can keep the motor at an appropriate temperature by controlling the opening degree of the third flow rate control valve to regulate the flow rate of the coolant flowing through the third heat exchanger, so as to make the temperature Tm of the motor higher than or equal to the predetermined first motor temperature Tm1 and lower than or equal to the predetermined second motor temperature Tm2 (>Tm1).

A hydraulic unit according to an eleventh aspect of the present disclosure is based on the hydraulic unit according to any one of the first aspect to the fourth aspect and further includes:

- a motor that drives the hydraulic pump;
- a control unit including a device that drives the motor; and
- a fan that supplies air for cooling at least one of the motor or the device of the control unit.

According to the present disclosure, at least one of the motor or the device of the control unit is cooled by the air supplied from the fan, so that it is possible to make the configuration simple as compared with a case where a heat exchanger for cooling is provided in the motor and the device of the control unit.

A hydraulic unit according to a twelfth aspect of the present disclosure is based on the hydraulic unit according to the first aspect or the second aspect and further includes:

- a motor that drives the hydraulic pump;
- a control unit including a device that drives the motor; and
- a second heat exchanger that causes the device of the control unit and the hydraulic oil flowing through the first return pipe downstream of the first heat exchanger to exchange heat with each other.

According to the present disclosure, the second heat exchanger can cool the device of the control unit using the hydraulic oil flowing through the first return pipe downstream of the first heat exchanger, and can suppress the occurrence of water condensation due to excessive cooling.

A hydraulic unit according to a thirteenth aspect of the present disclosure is based on the hydraulic unit according to the first aspect or the second aspect and further includes:

a motor that drives the hydraulic pump;

a third heat exchanger that causes the motor and the hydraulic oil flowing through the first return pipe downstream of the first heat exchanger to exchange heat with each other.

According to the present disclosure, the third heat exchanger can cool the motor using the hydraulic oil flowing through the first return pipe downstream of the first heat exchanger, and can suppress the occurrence of water condensation due to excessive cooling.

A hydraulic unit according to a fourteenth aspect of the present disclosure is based on the hydraulic unit according to the first aspect, the second aspect, the twelfth aspect, or the thirteenth aspect and further includes:

a second return pipe through which the hydraulic oil discharged from the actuator is returned to the oil tank; and a fourth heat exchanger that causes the hydraulic oil returning to the oil tank through the second return pipe and the coolant to exchange heat with each other, in which the first heat exchanger causes the hydraulic oil returning to the oil tank through the first return pipe and the coolant to exchange heat with each other, and causes the hydraulic oil from the fourth heat exchanger and the coolant to exchange heat with each other.

According to the present disclosure, the fourth heat exchanger cools the hydraulic oil discharged from the actuator, and the first heat exchanger cools the hydraulic oil cooled by the fourth heat exchanger and the hydraulic oil returning from the flow path between the discharge port of the hydraulic pump and the actuator to the oil tank through the relief valve, so that it is possible to further increase the performance of cooling the hydraulic oil.

A hydraulic unit according to a fifteenth aspect of the present disclosure is based on the hydraulic unit according to the twelfth aspect or the thirteenth aspect and further includes a second return pipe through which the hydraulic oil discharged from the actuator is returned to the oil tank.

A hydraulic unit according to a fifteenth aspect of the present disclosure is based on the hydraulic unit according to the first aspect or the second aspect and further includes:

a second return pipe through which the hydraulic oil discharged from the actuator is returned to the oil tank; and a fourth heat exchanger that causes the hydraulic oil returning to the oil tank through the second return pipe and the coolant to exchange heat with each other.

According to the present disclosure, the fourth heat exchanger cools the hydraulic oil discharged from the actuator, so that it is possible to further increase the performance of cooling the hydraulic oil.

The invention claimed is:

1. A hydraulic unit comprising:

an oil tank configured to store a hydraulic oil;

a hydraulic pump configured to supply the hydraulic oil in the oil tank to an actuator;

a first return pipe through which the hydraulic oil is returned from a flow path between a discharge port of the hydraulic pump and the actuator to the oil tank;

a first heat exchanger configured to cause a coolant to exchange heat with the hydraulic oil returning to the oil tank through the first return pipe;

a motor configured to drive the hydraulic pump;

a control unit including a power semiconductor configured to drive the motor; and a second heat exchanger located downstream of the first heat exchanger with respect to a flow of the coolant, the second heat exchanger being configured to cause the coolant discharged from the first heat exchanger to exchange heat with the power semiconductor of the control unit.

2. The hydraulic unit according to claim 1, further comprising:

a relief valve connected to the discharge port of the hydraulic pump, the first return pipe includes a pipe through which the hydraulic oil is returned to the oil tank through the relief valve.

3. The hydraulic unit according to claim 1, wherein the first heat exchanger includes a double pipe having an inner pipe with a multi-lobed cross section and an outer pipe accommodating the inner pipe.

4. The hydraulic unit according to claim 1, further comprising:

a second return pipe through which the hydraulic oil discharged from the actuator is returned to the oil tank, the first heat exchanger being configured to cause the coolant to exchange heat with the hydraulic oil returning to the oil tank through the first return pipe, and the coolant to exchange heat with the hydraulic oil returning to the oil tank through the second return pipe.

5. A hydraulic unit comprising:

an oil tank configured to store a hydraulic oil;

a hydraulic pump configured to supply the hydraulic oil in the oil tank to an actuator;

a first return pipe through which the hydraulic oil is returned from a flow path between a discharge port of the hydraulic pump and the actuator to the oil tank;

a first heat exchanger configured to cause a coolant to exchange heat with the hydraulic oil returning to the oil tank through the first return pipe;

a motor configured to drive the hydraulic pump; and a third heat exchanger located downstream of the first heat exchanger with respect to a flow of the coolant, the third heat exchanger being configured to cause the coolant discharged from the first heat exchanger to exchange heat with the motor.

6. A hydraulic unit comprising:

an oil tank configured to store a hydraulic oil;

a hydraulic pump configured to supply the hydraulic oil in the oil tank to an actuator;

a first return pipe through which the hydraulic oil is returned from a flow path between a discharge port of the hydraulic pump and the actuator to the oil tank;

a first heat exchanger configured to cause a coolant to exchange heat with the hydraulic oil returning to the oil tank through the first return pipe;

a motor configured to drive the hydraulic pump;

a control unit including a power semiconductor configured to drive the motor; and a second heat exchanger configured to cause the power semiconductor of the control unit to exchange heat with the hydraulic oil flowing through the first return pipe downstream of the first heat exchanger, the first return pipe being configured such that all the hydraulic oil discharged from the first heat exchanger passes through the second heat exchanger.

7. The hydraulic unit according to claim 6, further comprising:

a second return pipe through which the hydraulic oil discharged from the actuator is returned to the oil tank.

8. The hydraulic unit according to claim 7, further comprising:

a fourth heat exchanger configured to cause the hydraulic oil returning to the oil tank through the second return pipe and the coolant to exchange heat with each other.

9. The hydraulic unit according to claim 8, wherein the first heat exchanger is configured to cause the coolant to exchange heat with the hydraulic oil returning to the oil tank through the first return pipe, and cause the coolant to exchange heat with the hydraulic oil returning to the oil tank through the second return pipe.

10. The hydraulic unit according to claim 8, wherein the first heat exchanger is configured to cause the coolant to exchange heat with the hydraulic oil returning to the oil tank through the first return pipe, and cause the coolant to exchange heat with the hydraulic oil from the fourth heat exchanger.

11. A hydraulic unit comprising:

an oil tank configured to store a hydraulic oil;

a hydraulic pump configured to supply the hydraulic oil in the oil tank to an actuator;

a first return pipe through which the hydraulic oil is returned from a flow path between a discharge port of the hydraulic pump and the actuator to the oil tank;

a first heat exchanger configured to cause a coolant to exchange heat with the hydraulic oil returning to the oil tank through the first return pipe;

a motor configured to drive the hydraulic pump;

a third heat exchanger configured to cause the motor to exchange heat with the hydraulic oil flowing through the first return pipe downstream of the first heat exchanger, the first return pipe being configured such that the hydraulic oil discharged from the first heat exchanger passes through the third heat exchanger before the hydraulic oil returns to the oil tank.

12. The hydraulic unit according to claim 11, further comprising:

a second return pipe through which the hydraulic oil discharged from the actuator is returned to the oil tank.

13. The hydraulic unit according to claim 12, further comprising:

a fourth heat exchanger configured to cause the hydraulic oil returning to the oil tank through the second return pipe and the coolant to exchange heat with each other.

14. The hydraulic unit according to claim 13, wherein the first heat exchanger is configured to cause the coolant to exchange heat with the hydraulic oil returning to the oil tank through the first return pipe, and cause the coolant to exchange heat with the hydraulic oil returning to the oil tank through the second return pipe.

15. The hydraulic unit according to claim 13, wherein the first heat exchanger is configured to cause the coolant to exchange heat with the hydraulic oil returning to the oil tank through the first return pipe, and cause the coolant to exchange heat with the hydraulic oil from the fourth heat exchanger.

16. A hydraulic unit comprising:

an oil tank configured to store a hydraulic oil;

a hydraulic pump configured to supply the hydraulic oil in the oil tank to an actuator;

a first return pipe through which the hydraulic oil is returned from a flow path between a discharge port of the hydraulic pump and the actuator to the oil tank;

a first heat exchanger configured to cause a coolant to exchange heat with the hydraulic oil returning to the oil tank through the first return pipe;

a second return pipe through which the hydraulic oil discharged from the actuator is returned to the oil tank; and a fourth heat exchanger configured to cause the coolant to exchange heat the hydraulic oil returning to the oil tank through the second return pipe, the fourth heat exchanger being located downstream of the first heat exchanger with respect to a flow of the coolant such that the coolant discharged from the first heat exchanger passes through the fourth heat exchanger.

17. The hydraulic unit according to claim 16, wherein the first heat exchanger is configured to cause the coolant to exchange heat with the hydraulic oil returning to the oil tank through the first return pipe, and cause the coolant to exchange heat with the hydraulic oil from the fourth heat exchanger.

* * * * *